(12) United States Patent
Schnjakin et al.

(10) Patent No.: US 10,534,920 B2
(45) Date of Patent: Jan. 14, 2020

(54) DISTRIBUTED DATA STORAGE BY MEANS OF AUTHORISATION TOKEN

(71) Applicant: Bundesdruckerei GmbH, Berlin (DE)

(72) Inventors: Maxim Schnjakin, Berlin (DE); Philipp Berger, Berlin (DE); Hendrik Graupner, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 142 days.

(21) Appl. No.: 15/511,914

(22) PCT Filed: Sep. 15, 2015

(86) PCT No.: PCT/EP2015/071026
§ 371 (c)(1),
(2) Date: Mar. 16, 2017

(87) PCT Pub. No.: WO2016/041928
PCT Pub. Date: Mar. 24, 2016

(65) Prior Publication Data
US 2017/0293766 A1    Oct. 12, 2017

(30) Foreign Application Priority Data
Sep. 17, 2014   (DE) .................. 10 2014 113 430

(51) Int. Cl.
*H04W 12/06* (2009.01)
*H04L 29/06* (2006.01)
(Continued)

(52) U.S. Cl.
CPC ........ *G06F 21/602* (2013.01); *G06F 11/1076* (2013.01); *G06F 16/182* (2019.01); *G06F 21/6218* (2013.01); *H04L 63/083* (2013.01)

(58) Field of Classification Search
CPC .... G06F 21/602; G06F 11/1076; G06F 17/30; H04L 9/08; H04L 63/10
See application file for complete search history.

(56) References Cited

U.S. PATENT DOCUMENTS

2012/0173925 A1* 7/2012 Lahdensivu ........ G06F 11/1008
714/15
2013/0304711 A1* 11/2013 Resch ............... G06F 17/30371
707/690

FOREIGN PATENT DOCUMENTS

WO    WO-2011033174 A1    3/2011

OTHER PUBLICATIONS

International Preliminary Report for Application No. PCT/EP2015/071026 dated Mar. 30, 2017.
(Continued)

*Primary Examiner* — Wasika Nipa
(74) *Attorney, Agent, or Firm* — Harness, Dickey and Pierce, P.L.C.

(57) ABSTRACT

The invention relates to a method for storing data, wherein the method, in order to store a file (101), comprises: —automatic generation (602) of a distribution schedule (416); —performance (604) of an error correction method, which is specified in the distribution schedule, for generating file fragments from the file by a user computer system; —sending (606) of an authorisation enquiry (420) for storing the file fragments in the memory services (SD2, SD4-SD6) identified in the distribution schedule from the user computer system to a file management server via a network; —in response to reception of the authorisation enquiry by the file management server, requesting (608, 424) of an authorisation token by the file management server from each of the memory services identified in the distribution schedule and forwarding (610) of the authorisation token (428) obtained in response to the request to the user computer system by the
(Continued)

file management server; and —storage (612) of the generated file fragments in the storage media (SM2, SM4-SM6) of the identified memory services by means of authorisation verification by the authorisation token by means of the user computer system bypassing the file management server; wherein metadata (312) that permit the reconstruction of the file from the stored file fragments are stored in the user computer system and/or the file management server and are protected against access by the memory services.

17 Claims, 6 Drawing Sheets

(51) Int. Cl.
*G06F 21/60* (2013.01)
*G06F 16/182* (2019.01)
*G06F 11/10* (2006.01)
*G06F 21/62* (2013.01)

(56) References Cited

OTHER PUBLICATIONS

International Search Report PCT/ISA/210 for International Application No. PCT/EP2015/071026 dated Sep. 15, 2015.
Written Opinion of the International Searching Authority PCT/ISA/237 for International Application No. PCT/EP2015/071026 dated Sep. 15, 2015.

\* cited by examiner

DISTRIBUTED DATA STORAGE BY MEANS OF AUTHORISATION TOKEN

CROSS-REFERENCE TO RELATED APPLICATIONS

This application is the U.S. National Phase application of PCT Application No. PCT/EP2015/071026 filed on Sep. 15, 2015, which claims priority to German Patent Application No. 102014113430.3 filed on Sep. 17, 2014 the entire contents of each of which are incorporated herein by reference.

The invention relates to a method for storing data, a computer program product, a file management sever, and a user computer system.

Various methods for storing user data by means of one or more external memory services are known from the prior art, for example "OneDrive", "Dropbox", "Google Drive" and others. Here, the memory services differ from one another with regard to the security of the data stored there (different authentication and encryption methods), with regard to the price, with regard to the data availability and/or with regard to other factors. The memory services in some instances also offer various license agreements having different scopes, which can also change after a while. Due to the effort and costs associated with a registration for each individual memory service, only one single service is often used to store data externally, for example for backup purposes.

In comparison, the object of the invention is to create an improved method for storing data and also a corresponding computer program product, a user computer system, and a data management server.

The problems forming the basis of the invention are each solved by the features in the independent claims. Embodiments of the invention are specified in the dependent claims. The embodiments discussed hereinafter can be freely combined with one another, provided they are not mutually exclusive.

In accordance with the invention, a method for storing data is provided. The method comprises the following steps in order to store a file:

automatically generating a distribution schedule, which contains instructions for generating file fragments of the file by means of an error correction method and identifiers of a number of memory services, in the non-volatile storage media of which the generated file fragments are to be stored, by a file management server or by a user computer system;

performing the error correction method specified in the distribution schedule for generation of the file fragments from the file by the user computer system, wherein the file fragments contain error correction bits;

sending an authorisation enquiry of the user computer system for storing the file fragments in the memory services identified in the distribution schedule to a file management server via a network;

in response to receipt of the sent authorisation enquiry, requesting an authorisation token by the file management server from each of the memory services identified in the distribution schedule and forwarding the authorisation tokens obtained in response to the request to the user computer system by a file management server; and storing the generated file fragments via the network in the storage media of the identified memory devices by means of authorisation verification by the authorisation token, with the user computer system bypassing the file management server, wherein metadata, which allow the reconstruction of the file from the file fragments are stored in the user computer system and/or the file management server and are protected against access by the memory services.

This method can be advantageous since the storage of file fragments generated by means of an error correction method in various memory services can increase the availability of the data to be stored. In addition, the protection of the data against unauthorised access by the memory service can also be increased as a result: error correction methods generate file fragments which contain correction bits and thus allow a reconstruction of the original file depending on the proportion of the correction bits in the fragments and depending on the number of the generated file fragments, should one or more of the memory services fail temporarily or permanently. However, none of the memory services can reconstruct the data, even if the memory service should "crack" any encryption of the file fragments, since no memory service obtains all file fragments. The protection against unauthorised access by the operator of the memory service can thus be increased synergistically in that a strict separation of the access management by the file management server in the form of the request of the authorisation token and forwarding thereof on the one hand and the data management by the individual memory services on the other hand is provided as follows: the file fragments are stored directly in the memory services, with the user system bypassing the file management server. The file management server thus does not act as a router, but transmits merely the authorisation tokens, which allows the user computer system to store the file fragments via the memory services. The file management server thus has no access to the content of the transferred file fragments. The memory services again do not have the metadata required to reconstruct the file. These metadata are accessible merely to the user computer system and/or the file management server. In addition, the method can store externally much more quickly than conventional methods: so as to be able to have externally available at least one security copy of a file, a copy of this file previously had to be transferred to an external memory service. In the case of a failure of this external service, the security copy was lost or at least temporarily no longer available. In accordance with the invention, however, file fragments are stored by means of a number of memory services. This enables the parallel transfer of the file fragments via the network. With parallel transfer of the file fragments, the entire information content of the file inclusive of the error correction bits can be transferred within a fraction of the time that would be necessary to transfer an entire file copy to an individual memory service. In addition, should one the of memory services fail, the file is not lost thanks to the error correction bits, and instead can be reconstructed immediately and automatically from the other file fragments with the error correction bits and the metadata. This can be relevant in particular for files that have to have high availability, since for example these are necessary for the ability of a company to work. The fact that the distribution schedule is generated for the file can enable a finely tuned generation of the distribution schedule optimised for the file in question.

In accordance with embodiments, the user computer system is assigned to a user. The file management server performs an authorisation validation and only requests the authorisation tokens from each of the memory services identified in the distribution schedule if the authorisation validation has revealed that the user is authorised to store the file.

In accordance with embodiments, the generated file fragments are transferred in parallel via the network to the identified memory services for storage. This can increase the speed of the storage of the file.

In accordance with some embodiments, the distribution schedule is generated by the user computer system, for example a client application, which is installed on the user computer system. In accordance with other embodiments the distribution schedule is generated by the file management server and is transferred to the user computer system.

In accordance with some embodiments the method comprises the following steps:
- providing an editable configuration, which contains user requirements with regard to the speed, the geographical location, the security and/or the costs of an IT infrastructure to be used for the storing of data and also user requirements with regard to the availability of the data to be stored;
- providing a memory service catalogue, which comprises specifications of a multiplicity of available memory services, wherein the specification of each of the memory services contains details with regard to the speed, the geographical location, the security and/or the costs of an IT infrastructure of the memory service used for the storing of the data;
- in order to generate the distribution schedule, automatically evaluating the configuration and the memory service catalogue so as to identify, depending on the specifications of the available memory services and depending on the user requirements, an error correction method from a multiplicity of error correction methods that meets the requirements with regard to the availability of the data to be stored and so as to identify the memory services identified in the distribution schedule from the multiplicity of available memory services that are suitable for a distributed storing of the file in accordance with the user-specific requirements with regard to the speed, geographical location, security and/or costs of the IT infrastructure to be used for the storing of data; and
- using the identified error correction method as the error correction method of the distribution schedule.

By way of example, the configuration can contain rules that can be created and adapted by the user. Some rules should be discussed here by way of example: "if the file to be stored is a backup file, the costs per gigabyte storage space should be below 2 Euros"; "if the file to be stored is a backup file, the minimum guaranteed upload rate should be 1 MB/second"; "if the necessary file availability is 2×9/9, the costs per GB of storage space should be below 2, wherein the upload and download transfer rates should be as high as possible.

In embodiments in which the distribution schedule is generated by the user computer system, the automatic evaluation is also performed by the user computer system. If the distribution schedule is generated by the file management server, the automatic evaluation is also performed by the file management server. However, in both embodiments both the memory service catalogue and the user configuration are preferably stored centrally for use by a multiplicity of user computer systems, for example on a file management server or a database server connected thereto. This can facilitate the updating of the memory service catalogue. In accordance with some embodiments the file management server has an interface which is interoperable with interfaces of the memory services and, in the event of a change with regard to the security, geographical location, availability or costs of the IT infrastructure of one of the memory services, prompts an automatic updating of the specification of this memory service contained in the memory service catalogue.

In accordance with embodiments, features of the file to be stored are additionally taken into consideration for the automatic generation of the distribution schedule. These features for example can contain one or more of the following features: the file type (backup file or regularly used work file); the file format (.doc, .jpg, .avi, .pdf, .exe, etc.); the file size, and so on. If the distribution schedule is created by the file management server, these features can be transferred for example as part of a message from the user computer system to the file management server. This can be advantageous since different file types can be optimal for example for different memory services. For example, economical but relatively slow memory services can be suitable for seldom-used backup files, whereas memory services that offer a high upload rate and/or download rate can be more suitable for frequently used files. Said features of the file can influence not only the memory services, of which the identifiers are integrated into the distribution schedule, but can also influence the error correction method specified in the distribution schedule. If the file to be stored for example is very large and a quick storage via the network is desired, the error correction method can be automatically configured such that it generates many small file fragments, which can be quickly transferred in parallel via the network. In the case of a smaller file, an accordingly smaller number of file fragments can also be sufficient to ensure a sufficiently quick transfer.

In accordance with embodiments, the user computer system generates the metadata which allow the reconstruction of the file from the stored file fragments. The user computer system is assigned to a user. The metadata can contain one or more of the following elements:
- paths to all memory locations in the storage media of the memory services in which the file fragments of the file are to be stored or have already been stored in accordance with the distribution schedule; and/or
- a symmetric key, which allows a decryption of the file fragment encrypted with this symmetric key; the symmetric key for example can be a key specific for the file to be stored, which can further increase the security; the symmetric key for example can be a hash value of the file to be stored; at least the symmetric key can have been encrypted by a public cryptographic key of the user computer system, which fragmented the file for the purpose of storage, or by a public cryptographic key of another user computer system, which has already been identified by the file management server as authorised for access to the file already stored in a distributed manner. This can mean that the file management server cannot use the symmetric key for decryption of the file fragments, and therefore that the content of the file fragments is protected against access by the file management server; and/or
- for each of the file fragments, a hash value of the file fragment calculated by the user computer system; and/or
- the original file name of the file stored in a distributed manner; and/or
- configuration data of the error correction method; the specification can be in particular an identifier (ID) and/or configuration parameter of the error correction method used for generation of the file fragments (for example the later-explained parameters constituted by word length, number K of the generated file partitions and/or number M of the file partition losses that can be compensated;

a mapping of the original file name to the hash values and paths of the generated file fragments.

The user computer system stores the metadata in a (preferably protected) memory of the user computer system and transfers the metadata to the file management server. The file management server uses the transferred metadata to control the access of further users to the file. This can be implemented for example in that the metadata are made available selectively only to those further users who have sent an authorisation enquiry to the file management server to read and/or write the file and that have been identified by the file management server as authorised to carry out the requested read or write operation. This can be advantageous since the metadata allow the file management server to enable a finely tuned access control especially for this file for a multiplicity of further users, wherein the file management server does not have access to the data, nor can the individual memory services reconstruct the original file. For this, they are lacking the metadata and additionally the file fragments stored by the other memory services.

In accordance with some embodiments, metadata of a multiplicity of files stored in a distributed manner in the memory services are stored in the user computer system. A client application of the user computer system uses said metadata to generate a client-based view of the files stored in a distributed manner. Additionally or alternatively, metadata of a multiplicity of files stored in a distributed manner in the memory services are stored in the file management server. A web portal hosted on the file management server uses said metadata to generate a network-based view of the files stored in a distributed manner. A client-based view is for example a view generated by a processor of a user computer system acting as client of the file management server. A network-based view is for example a view generated by a processor of the file management server or of an application or web server operatively connected thereto and made available to a client via the network.

The client-based and/or the network-based view is configured to dynamically reconstruct the original file names of the multiplicity of files stored in a distributed manner from the metadata and, by selection of one of the files stored in a distributed manner, to initiate a dynamic and automatic reconstruction of the file content of the selected file by the user computer system or by a further authorised user computer system. The memory services in which fragments of the selected file are stored are hidden here by the view.

In some embodiments, the requirements with regard to availability, the geographical location, the speed, the security and/or costs contain one or more of the following data items in user-configurable form:

a specification of the error correction method in accordance with which the file fragments are to be generated so as to be stored in the storage medium of the memory service; the specification can contain in particular an identifier (ID) of an error correction method used as standard and standard configuration parameters, such as a word length, a number K of the file partitions to be generated without error correction bits, a number M of file partition losses that can be compensated, a cache size for the generation of the file partitions or file fragments of caches to be reserved, etc.; these standard configuration parameters can be dynamically modified as appropriate during the generation of the distribution schedule, depending on features of the file and/or features of the available memory services;

details regarding the minimum necessary availability of the memory service; this can include for example a specification of the maximum number of failed memory services at which the original file can still be reconstructed from the file fragments stored in the other memory services details regarding a geographical location, requested by the user, of the IT infrastructure of the memory service and/or the geographical location of the headquarters of the provider of the memory service;

details regarding the minimum data security to be offered by the memory service for the data stored in the memory service; these details can include for example a specification of the minimum necessary bit length of the key used to encrypt the file fragments;

details regarding the minimum data security to be offered by the memory service during a storing and/or reading of data via this memory service; these details can include for example a specification of the supported encryption protocols which can be used in the transfer of the file fragments;

details regarding the maximum costs of the transfer of the data to be stored to the memory service; the details can be specified for example in Euros per GB upload or download;

details regarding the minimum speed of the data upload to the memory service or of the data download from the memory service; the details can be specified for example in transferred MB per second for upload and/or download.

In accordance with embodiments, the details in each of the specifications of one of the memory services with regard to the availability, the geographical location, the speed, the security and/or the costs of the IT infrastructure of the memory service used for the storing of the file fragment contain one or more of the following data items:

details regarding the guaranteed minimum availability of the memory service;

details regarding the minimum data security offered by the memory service for the data stored by this memory service;

details regarding the minimum data security offered by the memory service during a storing and/or reading of data via this memory service;

details regarding the geographical location of the IT infrastructure of the memory service and/or the geographical location of the headquarters of the provider of the memory service;

details regarding the costs of the transfer of the data to be stored to the memory service;

details regarding the minimum guaranteed speed of the data upload to the memory service or of the data download from the memory service.

A "word" of the error correction method is a bit group, which constitutes the smallest unit, in relation to which an error is determined and is corrected as appropriate. Often, 8 bits are used as word length. A bit word length gives a fixed size of data that can be corrected.

The determination of the error correction methods that will be specified in the distribution schedule can include a determination of configuration parameters of the error correction method. For example, the following can belong to the configuration parameters: a word length W; a number K of file partitions without consideration of the error correction bits; and/or a number M of the file partitions K of which the loss will be compensated as necessary by the information content of the error correction bits. Here, a "file partition" is an initially generated file fragment which does not yet contain any error correction bit. The actual file fragments with the error correction bits that will ultimately be transferred to the memory services can be calculated from these initially generated file partitions.

By way of example, the file size of the file to be stored could be included in the determination of the error correction method. The file to be stored could have a file size of "10 Mb".

In accordance with a first example, the number of the file partitions K could be "4". This means that the error correction method divides the file to be stored initially into 4 file partitions having a size of 2.5 Mb. The number M of the file partitions of which the loss will be compensated as appropriate could be "1". The configuration parameters K=4 and M=1 mean that the error correction method generates a total of 5 file fragments which are each 10 Mb/4=2.5 Mb in size. In total, an error correction algorithm with the exemplary K=4, M=1 configuration would generate 12.5 MB data from the original source file 10 MB in size. Four of the file fragments could consist of the file partitions and thus could consist purely of file data, whereas the fifth file fragment could consist fully of error correction bits. In accordance with a second example, the configuration parameters could be K=4 and M=2 and could mean that the error correction method generates a total of 6 file fragments, 2 of which consist of error correction bits, and 4 of which consist of file partitions. A total of 6×2.5 Mb=15 Mb data are generated from the source file.

In addition to error correction methods which generate file fragments which consist either of file partitions or pure error correction data, in other embodiments error correction methods in which each generated file fragment includes a first proportion consisting purely of file data and a second proportion consisting of error correction bits can also be used. In the above-mentioned first example with K=4 and M=1 for a 10 MB file, 5 file fragments of 2.5 Mb could be generated for example, which per file fragment include 2.5 MB/5=0.5 Mb error correction bits. In the above-mentioned second example with K=4 and M=2 for the 10 MB file, 6 file fragments of 2.5 Mb could be generated for example, which each include (2*2.5 Mb)/6=0.83 Mb error correction bits.

The configuration parameters K and M in accordance with some embodiments are pre-configured as standard by the user, but can be dynamically changed depending on features of the file, depending on the user requirements and/or depending on the specifications of the properties of the available memory services, so as to provide an optimised distribution (with regard to costs, availability, etc.) of the file fragments. The dynamic configuration parameters are integrated into the generated distribution schedule in order to characterise the error correction method identified therein in greater detail. With a rising number M of the file partition losses that can be compensated, the availability and reliability of the files stored in a distributed manner is increased, however the size of the individual file fragments also increases with unchanged K.

In accordance with some embodiments, the configuration parameters M and/or K of the error correction method specified in the distribution schedule are determined such that with increasing user requirements in relation to the availability of the file, not only does M increase, but also K. As a consequence, the number of file fragments to be generated by the error correction method is also increased so as to keep the size of the individual file fragments approximately constant and so as to ensure a uniform short transfer time with parallel file fragment upload. In this case, the number of memory services used for the parallel storing of the file fragments and specified in the distribution schedule also has to be increased as appropriate. The configuration parameters K and/or M are preferably dynamically determined, and the user merely specifies in his configurable requirements whether the distributed storage is to be provided primarily in a cost-optimised, speed-optimised, or availability-optimised manner. This can be advantageous since the user therefore does not have to deal with the algorithmic specifics of the error correction method.

In accordance with embodiments, the determination of the error correction method which meets the user requirements with regard to the availability of the file includes a determination of the anticipated total size of all file fragments to be generated by the error correction method. Here, for each of the file fragments to be generated, a memory service is identified which, in accordance with its specifications, meets the requirements with regard to the speed, geographical location, security and/or costs under consideration of the anticipated total size. This can be advantageous because a very flexible method for the distributed storage of files is provided, which dynamically creates a suitable distribution schedule, inclusive of an error correction method dynamically adapted thereto, depending on the size of each individual file to be stored and the framework conditions predefined by the user and the available memory services.

Additionally or alternatively, the determination of the error correction method includes an automatic check as to whether the determined error correction method would prompt the generation of file fragments of which the total size does not make it possible to identify a sufficient number of memory services which, in accordance with their specifications, meet the requirements with regard to the speed, security and/or costs under consideration of the total size. If this is the case, i.e. if a sufficient number of memory services cannot be identified, another error correction method is automatically determined, which is configured to generate file fragments of which the anticipated total size is sufficiently small so that, for each file fragment to be generated, a memory service can be identified which, in accordance with its specifications, meets the requirements with regard to the speed, geographical location, security and/or costs under consideration of the anticipated total size. This can be advantageous because an automatic adaptation of the error correction method to the memory services currently available in accordance with the catalogue and the requirements currently specified by the user is possible without the need here for manual intervention on the part of the user.

Additionally or alternatively, the error correction method is automatically determined such that it is ensured that the user requirements with regard to a maximum duration of the data transfer for the transfer of the file via the network are met. In order to achieve this, the determined error correction method is automatically configured so that, as a result of this method, a sufficiently large number of the generated file fragments is generated, such that with parallel transfer of these file fragments to the memory services (upload) or from the memory services (download) specified in the distribution schedule (upload) or the metadata (download) the transfer time for all file fragments lies below the maximum duration.

The error correction method by way of example can be constituted by the Reed-Muller method, the Reed-Solomon method, the Cauchy-Reed-Solomon method, or comparable error correction methods.

In accordance with embodiments, the configuration also contains a minimum trust level. The minimum trust level can be configured and changed by the user. The minimum trust level specifies a minimum level of reliability, required by the user, of an authentication method by means of which a further user must authenticate himself to a file management server in order to be able to have read and/or write access to the file stored in the storage media of the identified memory services. This can be advantageous since the user is provided with a configurable and finely tuned control (at the file level) with regard to the access to this file by other users. For example, the user can rule out that a file containing particularly confidential and sensitive information can be seen by a user who has authenticated himself to the file management server only using an authentication method that can be cracked relatively easily (for example username and password).

In accordance with embodiments, the method also comprises a step of calculating a hash value of the entire file by the user computer system. The user computer system encrypts each of the file fragments of the file, wherein the hash value is used as a symmetric key for encryption of the file fragments.

Lastly, the user computer system encrypts the generated metadata, which contain the symmetric key, or at least the symmetric key by a public key ("encryption key") which is assigned to the user computer system which has stored the data in a distributed manner and which is assigned to a user. A private key ("decryption key") together with the public key forms an asymmetric cryptographic key pair, wherein the public key is stored in the file management server (DMS) linked to a user profile of the user assigned to the public key. The private key with which the metadata or the symmetric key can be decrypted again is preferably stored in a protected manner in the user computer system for which the metadata have been generated and encrypted. If a number of user computer systems are authorised for access to the files stored in a distributed manner, a separate version of metadata for a file stored in a distributed manner can be generated, in accordance with embodiments, for each of these authorised user computer systems, wherein the metadata or at least the symmetric key thereof is encrypted, by means of the public key of the relevant user computer system, by the user computer system which originally stored the file in a distributed manner in accordance with the distribution schedule. The metadata or the symmetric key can be decrypted only by the user computer system that has stored, in a protected manner, a private cryptographic key corresponding to the public encryption key.

Additionally or alternatively, the user computer system can encrypt the generated metadata by a public key of a further user computer system which is authorised to access the file and which is assigned to a further user, such that another version of the encrypted metadata is generated so as to use the other version of the metadata for a secure transfer to the further user computer system.

The user computer system generates the metadata for the file to be stored, wherein the metadata include at least the calculated hash value of the file (preferably in encrypted form) and also the hash values of the file fragments. The file fragments are stored in encrypted form in the storage media of the identified memory services. The encryption of the individual file fragments with a key created in a file-specific manner can further increase the security of the method, since another user, who legitimately or illegitimately receives the metadata of a specific file, can selectively access only this one file and for example cannot access another file. The hash value used as symmetric key by way of example can be a hash value calculated by means of an MD5, Sha-1 or Sha-2 hash algorithm.

In accordance with embodiments, the file fragment-specific hash values can serve as identifiers of the file fragments. The hash values of the file fragments can be linked by means of a mapping to the original file name, and the mapping can be included in the metadata together with the original file name. The user computer system encrypts each of the file fragments of the file, wherein the hash value of the total, original file is used as symmetric key. A strong encryption is preferably used, for example by means of AES-256 or AES 512.

In accordance with embodiments, the method includes an authentication of the user computer system to the file management server. Upon receipt of the authorisation enquiry for storage of the file fragments, the file management server checks whether the user to whom the user computer system is assigned has access rights in order to store the file by means of the identified memory services. The file management server then requests the authorisation tokens from the identified memory services only if the user has successfully authenticated himself to the file management server and if the user has the necessary access rights. Here, the access rights are checked preferably only on the basis of the requested write and/or read operation with respect to the file to be written or to be read. This has the advantage that the access control is finely tuned in respect of individual users and in respect of time, and in respect of individual files can be performed in a flexible and specific manner.

In accordance with embodiments, the authorisation tokens which are transmitted in response to the request of the file management server from each of the plurality of memory services identified in the distribution schedule to the file management server are selectively generated only for the authorisation enquiry to store the file and have only temporary validity. The same is also true for authorisation tokens which are generated by the memory services in response to requests to read the file or file fragments thereof. In accordance with embodiments, the authorisation tokens for the writing of file fragments are formed as URLs, which each enable direct write access to a storage space on the storage medium of one of the memory services identified by the URL. Similarly, authorisation tokens for the reading of file fragments are formed as URLs, which in each case enables direct read access to a storage space on the storage medium of one of the memory services identified by the URL. This can be advantageous since the file management server does not function as a router, which can ensure the protection of the data against unauthorised access by the file management server. The fact that the authorisation tokens have only temporary validity can also increase the security of the method. Once a predetermined period of time has elapsed, for example a few seconds, minutes or days, the authorisation token, for example a URL, is automatically invalid. The use of authorisation URLs additionally has the advantage that users not registered to the individual memory services can also be granted access to the file, since the file management server manages the access rights centrally. The owner of the file can specifically determine whether the access rights are purely read access rights or also write access rights. This can enormously increase the flexibility and number of application scenarios of the method, since further users must register themselves only with the file management server in order to be able to see, for example, a file. In accordance with some embodiments this is not even necessary. By way of example, a further user not registered with the file management server could also confirm his identity to the file management server by means of an electronic identity document. In embodiments however in which the key with which the file fragments have been encrypted is encrypted using the public key of an authorised receiver computer system, a registration can be necessary for the central saving of the public encryption key of the receiver computer system.

Each URL by way of example can consist of a path specification and further information. The path specification can include for example an ID of the memory service and also a path specification of the corresponding storage space on the storage medium of the memory service. The further information for example can comprise parameter values which form the basis of the authorisation of the user to access said storage space and which are checked by the memory service when the user computer system accesses the file fragment via said URL.

In accordance with embodiments, once the further user has successfully authenticated himself to the file management server and the file management server additionally has determined that the further user is authorised for access to the file, the file management server sends a public key of the further user, which for example is stored in a user profile managed by the file management server, to the user computer system which has stored the file in a distributed manner. Said user computer system receives the public key of the querying, authorised user computer system, encrypts the symmetric key with said public key, and sends the metadata with the encrypted symmetric key to the file management server. The file management server in turn sends the metadata of said file to the further user computer system. The file management server can optionally store said metadata, i.e. a version of the metadata of the file encrypted specifically for this authorised user computer system, such that, in the event of a later access enquiry of the authorised user computer system, the file management server can forward the stored metadata to the authorised user computer system directly without further interaction with the user computer system. The differently encrypted versions of the metadata generated for various authorised user computer systems can be stored by the file management server, for example in a database. The further user computer system uses its private asymmetric key stored in a protected manner in order to decrypt the metadata of the file or at least the encrypted symmetric key and uses the authorisation tokens requested and forwarded from the file management server to read the file by downloading the file fragments of the file from the individual memory services. As soon as the file fragments and the metadata or at least the symmetric key are present in decrypted form, a client application installed on the further user computer system uses the decrypted symmetric key in order to decrypt the file fragments. In addition, the metadata can also contain further information on the basis of which is clear how the content of the original file can be separated from the error correction bits generated by the error correction method and how the original file inclusive of the filename can be reconstructed from the file fragments.

All of these steps are preferably performed fully automatically under the control of the client application, such that the further user, wishing to read the file, in normal operation is unaware on which memory services and how many of these the file is stored in a distributed manner. This can be advantageous since the file management server can centrally manage the public keys of a multiplicity of users and, by forwarding both the metadata and the public keys, can selectively ensure that authorised further users are provided with a particularly high level of protection against unauthorised access. The symmetric key ensures that the file fragments are stored in encrypted form in the storage media of the individual memory services and that the upload and download of the file fragments is also performed in encrypted form, wherein another symmetric key is preferably dynamically generated for each unique file. The described combination of a file-specific symmetric key for encryption and decryption of the file fragments and a public key assigned to the user for integration of the symmetric key into the metadata of the file can additionally be advantageous since an encryption or decryption of large data volumes by means of symmetric cryptographic keys is generally much more superior than by means of an asymmetric cryptographic key pair. The speed aspect is of less relevance with regard to the encryption of the (relatively small) metadata, and therefore an encryption with an asymmetric cryptographic key pair can be reverted to here, which enables the exchange of a key necessary for decryption without hereby disclosing the private key. The encryption of the datasets with the separate hash value can be advantageous since it is thus made possible for the DMS to avoid redundant data storage, for example if different users should store the same content.

In accordance with some embodiments, a signing key is stored in the file management server in protected form. The method also comprises a step of providing a signature validation key to each of the memory services. The signature validation key is designed to validate the signatures generated by the signing key. The file management server signs the authorisation token received from each of the identified memory services with the signing key. The authorisation tokens are then forwarded in signed form to the user computer system. Each of the signed authorisation tokens enables a receiver of this signed authorisation token to access a storage space on the storage medium of the corresponding memory service identified by the authorisation token only when the memory service in question identifies the signature as being valid. The individual memory services thus preferably perform a signature validation in order to further increase the security of the data stored by said services. The authorisation tokens are also signed both for authorisation tokens which enable read access to a file already stored in a distributed manner and for authorisation tokens which ensure write access for the distributed storing of a file.

In accordance with embodiments, the method also comprises the steps of:
  receiving, by the file management server, an access enquiry of a further user computer system for access to the file stored in a distributed manner;
  identifying the memory services that have stored file fragments of the file on the basis of the metadata of the file by the file management server;
  checking, by the file management server, whether a further user, to whom the further user computer system is assigned, has access rights for the type of requested access and for the file; the type of requested access can be a write access or a read access for example; some embodiments can also distinguish between write access, modification access, delete access, and read access;
  authenticating the further user computer system to the file management server;
  following successful authentication and if the further user has access rights for the file, requesting a further authorisation token by the file management server form each of the memory services identified on the basis of the metadata, and forwarding the further authorisation tokens obtained in response to this request to the further user computer system by the file management server, wherein the further authorisation tokens allow the further user computer system to have the requested access to the file fragments stored in the memory services in direct form.

The fact that the access of further users to the stored file is subject to the control of the file management server and not the individual memory services can be advantageous since on the one hand a registration of the further users with the individual memory services is not necessary and on the other hand the security of the stored data is increased, since a strict separation of user management and authorisation management on the one hand and data storage on the other hand can be ensured.

In accordance with embodiments, the file management server checks whether the authentication method used to authenticate the further user to the file management server is sufficiently reliable to meet the minimum trust level for the requested access (for example read access or write access) configured by the user in the requirements. The request for the further authorisation token is only sent from the file management server to the identified memory services when the further user has successfully authenticated himself to the file management server, has access rights for the requested file, and the used authentication method has a trust level that is at least as high as the minimum trust level specified in the configuration of the user to whom the file belongs. This can be advantageous because individual files can obtain a particularly high access protection by means of the consideration of the trust level.

In accordance with embodiments, the configuration of the user contains a specification of a type of computer which is alone authorised to access data that the user has stored in the storage media of the identified services. The request of the further authorisation token is only sent from the file management server to the identified memory services if the further user computer system, from which the further user has sent the access enquiry to the file management server, meets said specification of the sole authorised computer type.

A "type" of computer is understood hereinafter to mean a set of computers which have at least one feature in common which influences the integrity of the data processed by the computer and/or the integrity of the programs executed by this set of computers and which differentiates this type of computers from other computers which do not have this feature. The at least one feature could include the fact that the computer system is immobile, since in the case of mobile devices an increased risk of loss and therefore disclosure or compromise of the data programs stored on this computer system must be assumed. The at least one feature could include whether the computer system has specific security provisions, such as virus scanners or a firewall or requires authentication of the user by means of a hardware token. These features can thus be advantageous because a user, for each of his individual files, can specify that another user by way of example can access this file only from his workplace computer, but not from his mobile telephone or mobile computer.

In accordance with embodiments, the file management server manages a user profile of the user to whom the user computer system is assigned. The user profile contains a public key, which together with a private decryption key forms an asymmetric cryptographic key pair. Said private decryption key serves to decrypt the metadata of the file, since these are encrypted using the public key of the authorised user/his devices. If the further user, who seeks access to the file, has authenticated himself successfully to the file management server and if the further user has the access rights for the file, the file management server sends the public key of the further user computer system that originally fragmented the file and stored it in a distributed manner, so as to enable the user computer system to encrypt the symmetric key, which was used to encrypt the file fragments, using the public key. The file management server receives the metadata of the file with the encrypted symmetric key from the user computer system and forwards these to the further user computer system so as to enable the further user computer system to decrypt the metadata or the symmetric key within the metadata using the private key of the further user computer system and so as to enable a reconstruction of the file from the decrypted data fragments. The file reconstruction can include for example a decryption of the encrypted file fragments by means of a symmetric cryptographic key contained in the decrypted metadata, which is identical to the hash value of the original file.

Alternatively, it can be that a version of the metadata which was generated and encrypted for the authorised user computer system at the time of the first successful access enquiry thereof in relation to the file has been stored by the DMB and is thus already present there locally. In this case, the DMS identifies this version of the metadata automatically as belonging to the querying, authorised user computer system and forwards it to the authorised further user computer system. The access to the version stored locally by the DMS replaces an interaction with the user computer system of the file owner. The method can thus be accelerated, and the data traffic over the network can be reduced.

In accordance with embodiments, a private cryptographic key is stored in a protected manner in the user computer system and is communicated neither to the file management server nor to another user computer system. The private key, also referred to here as a 'private asymmetric key' together with an associated public key forms an asymmetric cryptographic key pair. By way of example, the key pair can be generated during the course of the installation of a client application on the user computer system and in so doing can be uniquely assigned to the user. This can include for example the fact that the associated public key is transferred from the user computer system to the file management server and is stored there as part of the user profile of the user of this user computer system. Accordingly, other user computer systems can also each be assigned an asymmetric cryptographic key pair.

In accordance with some embodiments, the user computer system that stores the file in a distributed manner in the memory services uses and/or generates a symmetric key in order to encrypt the file fragments of the file prior to the transfer thereof to the memory services. The symmetric key for example can be a dynamically calculated hash value of the file to be stored. An encryption by means of a symmetric key for example can have the effect of increasing the performance of the encryption. The symmetric key is then used by the user computer system as part of the metadata necessary for reconstruction of the file. The metadata with the symmetric key are stored initially locally by the user computer system in a memory of the user computer system, whereas the encrypted file fragments are stored via the network in the memory services as described beforehand. No other user computer system, not even the file management server, can access the file stored in a distributed manner, since these are not in possession of the metadata. In accordance with some embodiments, in which the metadata are retained locally in one or more versions by the DBMS, the DMS cannot decrypt at least the file fragments forming the basis of the file, since the metadata or at least the symmetric key contained therein is encrypted using the public key of an authorised user computer system and the DMS is not in possession of the corresponding private key.

The file management server can allow another user computer system requesting access to said file stored in a distributed manner by the user computer system to access the file by means of the following steps:

Firstly, the authorisation of the other user computer system is checked by the file management server in order to determine whether the other user computer system is authorised for access to the file.

If the other user computer system is authorised for access, transferring a public cryptographic key, which is assigned to the other user computer system, from the file management server to the user computer system via the network. The public key of the other user computer system can be stored for example in the user profile of another user to whom the other user computer system is assigned or can already have been transferred previously or together with the authorisation enquiry of the other user computer system via the network from the other user computer system to the file management server.

The user computer system which had originally stored the file in a distributed manner and which possesses the metadata receives the public key of the other user computer system from the file management server;

The user computer system uses the received public key in order to encrypt at least the symmetric key which was used to encrypt the file fragments. The other metadata, for example information regarding which memory services and memory service paths in which the file fragments are stored, are preferably not encrypted or are encrypted using a public key of the file management server; the metadata thus now contain the symmetric key in encrypted form;

The metadata with the encrypted symmetric key are transmitted from the user computer system to the file management server;

The file management server analyses the received metadata in order to identify on this basis those memory services in which the file fragments necessary in order to reproduce the source data have been stored;

The DMS identifies authorisation tokens for access to the file fragments of the file and conveys the identified authorisation tokens to the authorised other user computer system. This can be implemented for example in that the DMS accesses locally stored authorisation tokens for the file fragments of the file. The locally stored authorisation tokens may have been generated by the memory services for example during the course of the writing of the file fragments and may have been transmitted to the DMS. Alternatively, the authorisation tokens can have been newly requested by the individual memory services and received by the DMS in response to the access enquiry of the other user computer system.

However, the file management server, although in possession of the authorisation tokens, cannot use the metadata in order to reconstruct the content of the original file, since the symmetric key within the metadata is encrypted with the public key of the querying other user computer system. The encryption of the symmetric key and secure storage of the private decryption key on the user computer system protects the file against access by the file management server;

The file management server transmits the metadata or at least the encrypted symmetric key of the metadata to the querying other user computer system; this can occur for example together with the transfer of the authorisation tokens for access to the file fragments to the other user computer system or in a separate message;

The other user computer system receives the authorisation tokens and receives the metadata or at least the encrypted symmetric key of the metadata;

The other user computer system decrypts the encrypted symmetric key with the aid of its private key, which is stored in a protected manner in the other user computer system and which together with the public key used to encrypt the symmetric key forms an asymmetric cryptographic key pair;

The other user computer system, as already described for a number of embodiments, can download the file fragments stored in encrypted form from the memory services by means of the authorisation tokens and can reconstruct the original file by means of the metadata also received. For this purpose, the other user computer system uses its private key to decrypt the encrypted symmetric key and uses the decrypted symmetric key to decrypt the file fragments received in encrypted form.

This can be advantageous since only the owner and the user computer systems authorised by the owner in respect of individual files can decrypt file fragments. The file management server or unauthorised user computer systems are unable to access the contents of a file or fragments thereof. Besides the user computer system and the other user computer system, a number of further user computer systems can also be registered with the file management server. A private asymmetric key can be stored in each of the storage media thereof, such that these private keys are protected against access by other user computer systems and against access by the file management server. This can be advantageous since the file management server as a result is unable to use these keys to decrypt the symmetric keys of the metadata that have been transferred to the file management server.

In accordance with embodiments, the file management server, for each stored file, manages one or more versions of metadata. One of these versions contains a symmetric key that was used to encrypt the file fragments generated from the file and that is encrypted by a public key of the user computer system which stored the file in a distributed manner. Another of the versions contains fundamentally the same data, wherein however the symmetric key is encrypted by a public key of a further user computer system which has been identified by the file management server as authorised for access to the file.

In accordance with embodiments, the user computer system belongs to a user to whom at least one further user computer system is also assigned. The method comprises the following steps:

After the distributed storage of the file by the user computer system and after the transfer of the metadata generated for this file to the file management server, registering the further computer system with the file management server as a user computer system assigned to the owner of the file.

Receiving a public key, which is assigned to the further user computer system, by the file management server.

The public key can be automatically generated, for example during the course of the installation of a client application interoperative with a file management application of the file management server, by the client application of the further user computer system.

Assigning the received public key to the user and to the further user computer system in the profile data of the user by the file management server; this can be implemented automatically for example during the course of the registration and preferably after a confirmation by the user that the further user computer system is to be registered for this;

Automatically sending an enquiry in order to obtain a further version of metadata for the registered further user computer system from the file management server to the user computer system which originally stored the file in distributed form, wherein the enquiry contains the assigned public key;

In response to receipt of the enquiry, automatically generating a further version of the metadata, which enable a reconstruction of the file, wherein the further version of the metadata or parts of the further version of the metadata are encrypted with the public key in the enquiry; in particular, the symmetric key used by the user computer system to encrypt the file fragments can be encrypted using the public key of the enquiry;

Sending the further version of the metadata from the user computer system to the file management server; and Storing the further version of the metadata by the file management server.

This can be advantageous since, during the course of a registration of further user computer systems for a user already registered, further versions of the metadata of all files which the user has already generated and stored in a distributed manner by means of his user computer system already registered beforehand are automatically also generated and enable the user to also have access via the further registered user computer system without the need for any manual intervention on the part of the user for this purpose. The enquiry to obtain a further version of metadata for the registered further user computer system is preferably generated in a file-specific manner and only when the file management server establishes that the further user computer system is also authorised for access to this file. This can be dependent for example on the type of further user computer system, i.e. for example on whether the further user computer system is mobile or immobile or whether it belongs to a list of authorised workplace computers, which for example can be identified as such via their MAC or IP address.

In a further aspect the invention relates to a computer-readable storage medium having computer-readable instructions which, with execution by a processor, prompt the processor to carry out the method in accordance with one of the previous claims. The computer-readable storage medium can also consist of a combination of a number of computer-readable storage media.

In a further aspect the invention relates to a user computer system comprising a processor and a network interface for operatively coupling the user computer system to a multiplicity of memory services and to a file management server via a network. The user computer system comprises a storage medium with a client application which can be executed by the processor and which is configured to execute the following method for storing a file:

using a distribution schedule, which contains instructions for generating file fragments of the file by means of an error correction method and identifiers of a number of memory services in the non-volatile storage media of which the generated file fragments are to be stored, wherein the file management server does not provide a memory service;

performing the error correction method specified in the distribution schedule for generating the file fragments of the file, wherein the file fragments include error correction bits;

sending an authorisation enquiry of the user computer system for storing the file fragments in the plurality of memory services identified in the distribution schedule to a file management server via a network;

in response to the sending of the authorisation enquiry, receiving authorisation tokens from the file management server for each of the memory services specified in the distribution schedule; and storing the generated file fragments via the network in the storage media of the identified memory services by means of authorisation verification by the authorisation tokens, with the user computer system bypassing the file management server.

Metadata, which allow the reconstruction of the file from the stored file fragments, are protected against access by the memory services. The metadata can be stored for example in the user computer system and/or the file management server.

In accordance with some embodiments, the distribution schedule is generated by the user computer system, and in accordance with other embodiments it is generated by the file management server and is transferred to the user computer system via the network. Features of the file to be stored can also be included in the generation of the distribution schedule, wherein the features in the case of the server-side generation of the distribution schedule are also transferred as part of a message from the user computer system to the file management server via the network.

In a further aspect the invention relates to a file management server. The file management server comprises a processor and a network interface for operatively coupling the file management server to at least one user computer system of a user and to a multiplicity of memory services via a network. The file management server also comprises a storage medium with a file management application which can be executed by the processor and which is configured to execute the following method for storing a file:

receiving an authorisation enquiry of the user computer system to store file fragments of a file via the network in a plurality of the memory services; and in response to the receipt of the authorisation enquiry, requesting an authorisation token from each of the plurality of memory services and forwarding to the user computer system the authorisation tokens obtained in response to the request.

The file management server does not provide a memory service. Metadata, which allow the reconstruction of the file from the stored file fragments, are protected against access by the memory services. The metadata can be stored for example in the user computer system and/or the file management server.

In accordance with embodiments, identifiers of the plurality of memory services are specified in a distribution schedule. The distribution schedule includes instructions regarding the generation of file fragments of the file by means of an error correction method. The file management server can also be configured to:

automatically generate the distribution schedule, which contains instructions regarding the generation of file fragments of the file by means of an error correction method and identifiers of the plurality of memory services in the non-volatile storage media of which the generated file fragments are to be stored;

transferring the distribution schedule to the user computer system in order to enable this to perform the error correction method specified in the distribution schedule for generation of the file fragments.

A "distribution schedule" in the sense of the present invention is a specification which at least contains details regarding the identity of the memory services via which fragments of a file are to be stored and also contains details which determine an error correction method which is to be used for generation of these file fragments from said file. A distribution schedule can be formed for example as an XML file or binary file.

A "file management server" is a computer system which has an interface for communication with one or more user computer systems and for communication with a plurality of memory services in order to grant the one or more user computer systems access rights to storage media managed by these memory services. Here, the file management server itself does not provide a memory service and is preferably also separated from the memory services by security measures which ensure that none of these memory services has access to data managed by the file management server, in particular for example user profiles and metadata. The file management server can consist of a data processing device or of a plurality of data processing devices, in particular computers, which cooperate with one another and are jointly managed in order to provide the functionality of the file management server in accordance with the above-described embodiments.

An "authorisation token" is a data structure, for example a file or a URL, which contains information which grants an entity in possession of this authorisation token with authorisation to access storage regions of external storage media. The external storage media can be provided for example by a memory service via a network, such as the Internet. In accordance with embodiments, the authorisation token can contain both a pointer and an authorisation permit. The pointer can consist for example of a combination of an IP address of a memory service and a file path of a storage medium managed by this memory service. The authorisation permit can include for example one or more data values which identify the user of the authorisation token as authorised for access, for example a random value generated by the memory service which can be compared with a reference value. Said data values can also comprise a signature.

A "memory service" is a service provided via a network and which enables one or more user computer systems to send data via the network to the service so that these data are stored by the memory service on one or more storage media managed by the memory service, and/or enables the user computer systems to access data already stored by this or another user computer system via the network (for example grants read access or write access). Here, an individual memory service is preferably technically and organisationally separate from any other memory service. In accordance with embodiments, each of the memory services is configured to receive data from the user computer system via the network via an interface and to store this data in the non-volatile storage medium of said memory service.

A "user computer system" will be understood hereinafter to mean a data processing system, for example a desktop PC, a notebook or a smart phone, which is assigned to a user.

A "view" is a dynamically generated visual representation of data, in particular of one or more files. In accordance with embodiments, the view includes a list or other arrangement of a plurality of files, wherein each file is displayed in the view under its original file name, optionally supplemented by further file data, such as file size, date of the last change, file type, etc. The dynamically generated visual representation can be based on a complex data processing process for example of metadata of a number of files, which includes an automatic decryption and processing of metadata of a plurality of files stored in a distributed manner.

A "trust level" will be understood hereinafter to mean a set of one or more parameter values which specifies a degree of trustworthiness with regard to whether a user who has authenticated himself to the file management server using a computer system assigned to said user is also in fact the same user that he claims to be by providing his authentication data.

An "error correction bit" or "parity bit" is a bit which is generated additionally to one or more bits of the actual user data and which is transferred as appropriate to a receiver and which serves to check the integrity of said one or more bits of the user data during the transfer to the receiver.

An "error correction method" is a method which serves to identify and to correct errors in the storage and transfer of data, wherein an error can also consist in the fact that parts of a logically cohesive data volume (for example a file) are temporarily or permanently unavailable, for example due to the failure of a storage medium which had stored these parts. In order to achieve this, error correction methods, prior to the storage or transfer of user data, add additional redundancy to this user data in the form of additional error correction bits, which can be used to determine errors and error positions and also to reconstruct missing parts of the user data.

In accordance with embodiments, a client application is installed on each of the user computer systems and is interoperable with a file management application of the file management server. The client application can contain program logic in which the steps of the method executed by the user computer system are coded in accordance with one of the aforementioned embodiments. The file management application can include program logic in which the steps of the method executed by the file management server are coded in accordance with one of the aforementioned embodiments.

Embodiments of the invention will be explained in greater detail hereinafter with reference to the drawings, in which.

Elements of the following embodiments which correspond to one another are characterised by the same reference signs.

Figure 1:
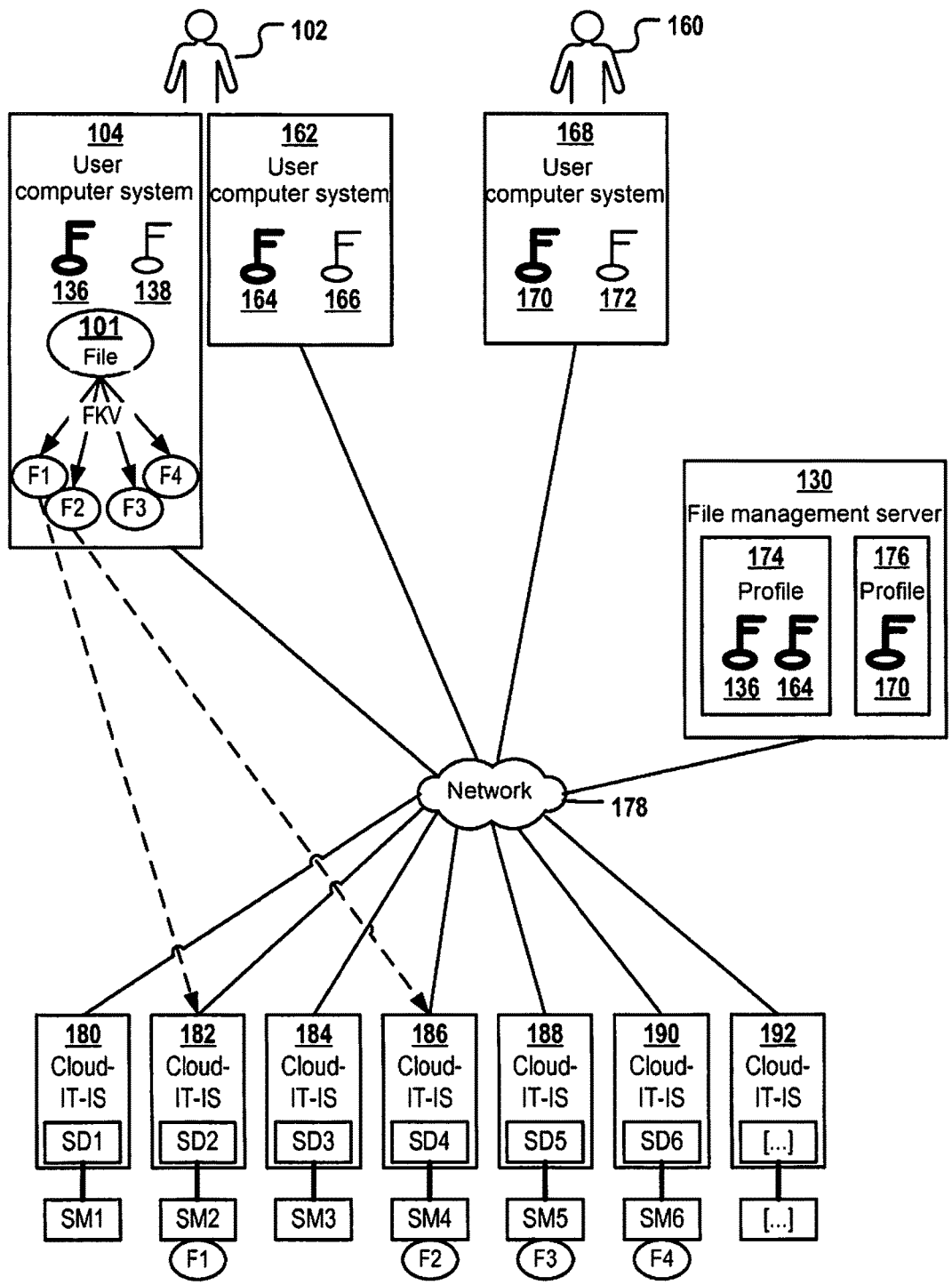
FIG. 1 shows a plurality of user computer systems, memory services, and a file management server.

FIG. 1 shows a distributed computer system for storing data, which computer system comprises a plurality of user computer systems 104, 162, 168, a plurality of memory services SD1-SD6 with corresponding IT infrastructures 180-192 and storage media SM1-SM6, and a file management server 130, which are each connected to one another via a network 178. The system enables an automated and dynamic provision of memory resources of the individual memory services, which for example can each be formed as public cloud memory services. The memory services are preferably selected dynamically on the basis of requirements, which a user 102, 160 can store in a centrally stored user profile 174, 176, on the basis of specific features of the file 101 to be stored and/or on the basis of technical and/or organisational properties of the respective memory services SD1-SD6, which for example can be stored centrally in a catalogue 329.

The user 102 can be assigned for example two user computer systems 104, 162, for example a desktop computer and a notebook. During the course of the installation of a client application, an asymmetric cryptographic key pair specific for each user computer system can be generated. The private key 138, 166 is stored in a protected manner in the corresponding user computer system. The corresponding public keys 136, 164 are transferred to the file management server and are managed centrally thereby. By way of example, the user 102 is assigned the user profile 174, which contains the two public keys 136 and 164. The user 160 is assigned the user profile 176, which contains the public key 170. The private key 172 corresponding to the public key 170 is stored in a protected manner on the further user computer system 168. The file management server 130 acts as a central entity for managing user accounts, user requirements 308, 320, and for checking the authorisation of individual users for carrying out a file-based access operation. The way in which this is implemented will be explained in greater detail hereinafter in FIGS. 2 and 3. The two dashed arrows from FIG. 1 indicate, in relation to the file fragments F1 and F2, that the file fragments F1-F4 generated by the error correction method FKV from the file 101 are directly stored with the aid of an authorisation token, with bypassing of the file management server 130. However, an interaction of the user computer system 104 with the file management server 130 is necessary in order to obtain the authorisation tokens issued by the individual memory services.

Figure 2:
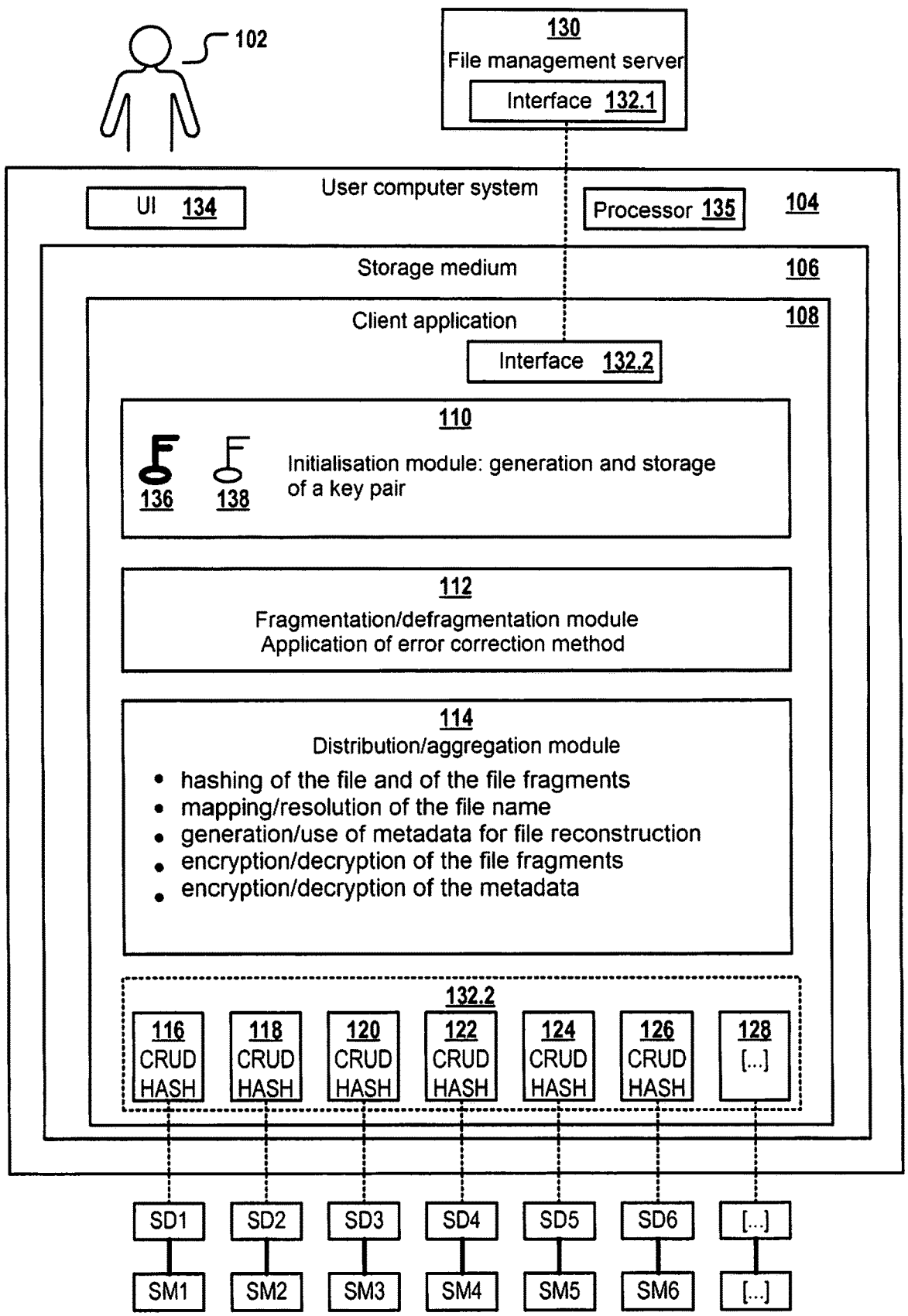
FIG. 2 shows a block diagram of one of the user computer systems.
Figure 3:
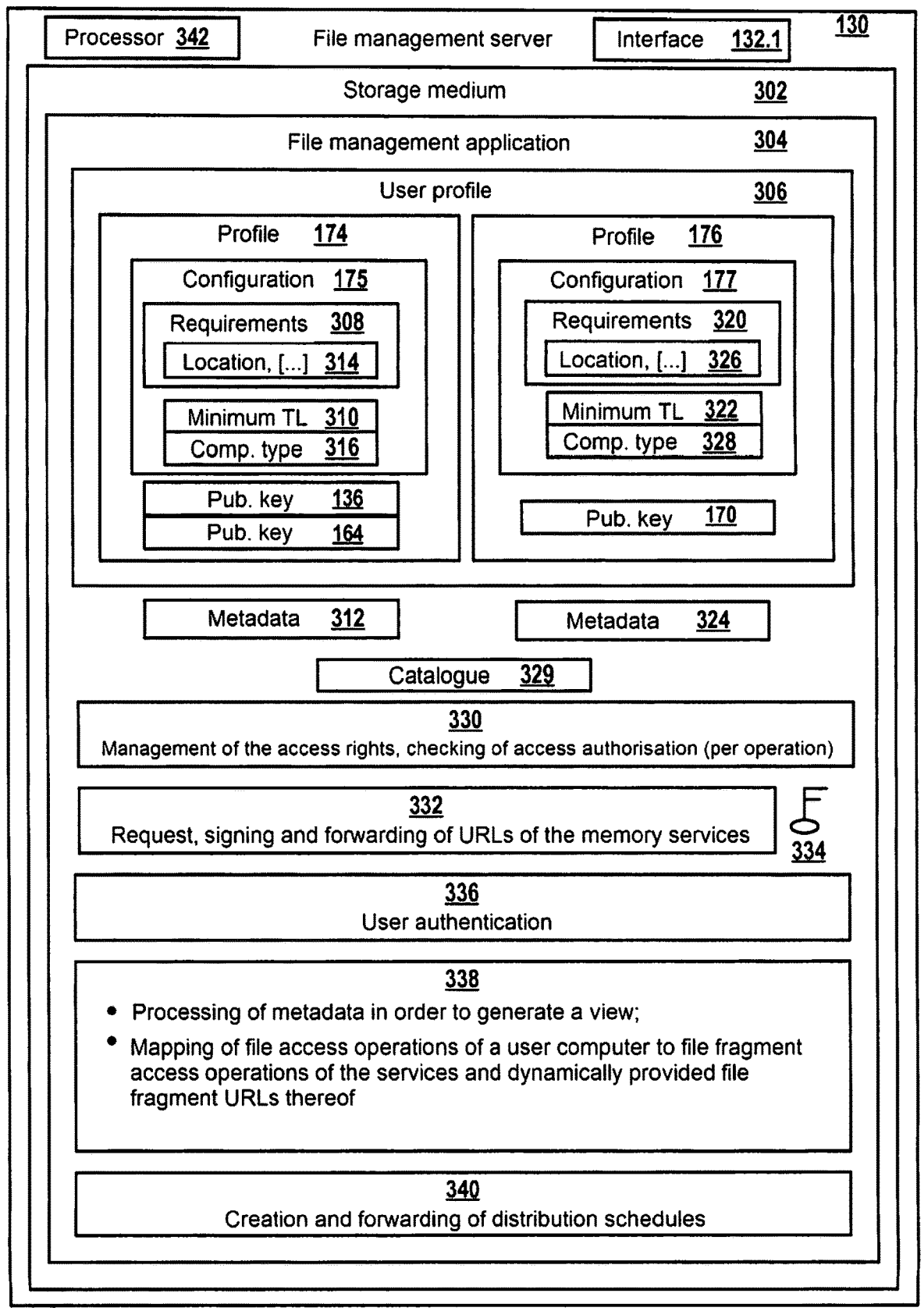
FIG. 3 shows a block diagram of the file management server.

FIG. 2 shows a block diagram of the user computer system 104. The user computer system includes a user interface 134. This interface can include, for example, a graphic user surface which displays a view of a file 101 to be stored in a distributed manner and/or one or more files already stored in a distributed manner. In addition, the interface 134 can comprise input means, for example a keyboard or mouse, which allows the user to select individual files or to update data and requirements stored in the user profile and/or to determine in the user profile 174 of the user 102 which users or user groups under which preconditions shall be authorised for access to the file 101. The user computer system 104 includes a processor 135 and a non-volatile storage medium 106 on which a client application 108 is installed, which communicates via an interface 132 with a file management application 304 installed on the file management server 130. The client application 108 can additionally provide an interface 116-128, which defines standardised file operations ("CRUD": "CREATE", "READ", "UPDATE", "DELETE") which can be interpreted and performed by each of the memory services. The interfaces 116-128 are thus ultimately uniform interfaces with uniform method signature for CRUD operations.

The application 108 includes an initialisation module 110, which for example during the course of the installation of the application 108 on the user computer system 104 generates the asymmetric cryptographic key pair 136, 138 and transmits the public key 136 via the interface 132 to the file management application 304. The module 110 thus allows the generation and secure management of the public and private keys 136, 138.

In addition, the client application 108 can comprise a fragmentation/defragmentation module 112, which can break down a file 101 into a plurality of file fragments F1-F4 by applying an error correction method FKV specified in a distribution schedule and can enrich the file with error correction bits. If one or more of the memory services on which file fragments of the file are stored should fail, the defragmentation function of the module 112 can regenerate the original file from the remaining file fragments, provided the error correction bits contained in the other file fragments are sufficient for this purpose.

A further module 114, referred to here as a distribution/aggregation module, includes a number of functionalities which serve for the distributed and secure storage of the file fragments generated by the module 112 in the memory services SD2, SD4-SD6 specified in the distribution schedule. The module 114 can calculate for example a hash value of the original file 101 and can use this as symmetric key for rapid encryption of each of the file fragments F1-F4 of the file 101. In addition, a hash value of each of the generated file fragments F1-4 can be calculated, which serve as identifiers of the file fragments and which are assigned to the original file name of the file by means of a "mapping". The said data hash values, the private key, and the mapping can serve as metadata in order to enable a reconstruction of the file from the file fragments. In addition, the metadata can include identifiers and paths of the memory services in which the file fragments have been stored. The metadata 312 of the file 101 generated by a user computer system 104 are preferably encrypted at least in part by a public key 136, which is specifically assigned to the user computer system 104 and thus also to the user 102, and are transferred in encrypted form to the file management server 130 via the network 178. If the user computer system at a later moment in time should access the files stored in a distributed manner, it can receive the metadata from the file management server and can decrypt the encrypted symmetric key, which is contained in the metadata, by means of its private key 138. The aggregation functionality of the module 114 for example allows a reconstruction of the original file 101 from the file fragments F1-F4 with the aid of the metadata 312 and the private key 138, which serves to decrypt the metadata encrypted using the public key 136.

The file management server 130 comprises a processor 342 and a non-volatile storage medium 302, on which a file management application 304 is installed. This can serve for the management of a plurality of user profiles 306, for example the user profile 174 of the user 102 or the user profile 176 of the user 160. The users can define in their user profile in a configuration 175 those requirements 308 which are contained with regard to costs, geographical location, data security and data availability in relation to the IT infrastructures used by the memory services SD1-SD6. The requirements 308 can also be defined uniformly for entire user groups, for example for employees of companies. This can be advantageous since company-wide standardised provisions with regard to the costs, geographical location, security and availability of the files stored in a distributed manner can hereby be provided. In addition, the user 102 can specify which other users or user groups under which conditions (for example with regard to a minimum trust level 310 or type 316 of the used user computer system) the other users or the other user groups shall be granted access to a file of the user 102 by the file management server.

The file management application 304 can thus manage the user profiles of the number of users as central authority and can also monitor and implement the specifications of the user with regard to the access authorisation of other users to the files of said user. Besides the user profiles, the file management application 304 can also manage the metadata 312, 324 of a multiplicity of files, stored in a distributed manner, of a number of users and/or a catalogue 329 comprising the specifications of all available memory services SD1-SD6.

The module 330 of the file management application 304 is for example responsible for the central management of the access rights and for the file-based checking of access authorisation by other users. A user can identify himself as being authorised to the file management application 304 by proving his identity, which can be composed of different attributes (name, email address, bank account, home address, date of birth, nationality, etc.) in a trustworthy manner to the file management application 304. The authenticity of these attributes can be confirmed with different levels of effort (for example a bank account by a transfer with a transmitted secret in the field "purpose", email by sending a mail with a confirmation link, home address or date of birth, or by secure reading of the data from an electronic identity document). The module 330 assigns a specific trust level to the different attributes. This value illustrates the quality of the identification. The module 330 preferably has a gradual classification of a number of trust levels in relation to one or more digital identities of a user. The users can thus specify individual requirements (minimum trust levels) with regard to the trustworthiness of the identification of other users in the event of access to particular files. When sharing the data with another user, a user can define a minimum trust level at which his counterpart is to be identified. Whether the other user meets the required minimum trust level is thus dependent on the authentication method of the other user to the file management server by means of which the other user confirms his digital identity (i.e. for example username/password, email address, electronic identity document, or another security token, such as FID).

The module 332, once the user has proven his authorisation for access to a file to the file management application, serves to request authorisation tokens from the memory services specified in the distribution schedule (with initial write access) or the metadata (with read access, with an UPDATE or DELETE operation). The authorisation tokens are signed using a signing key 334 of the file management application and are sent in signed form to the user computer system from which a corresponding authorisation enquiry for file access has been received.

The module 338 manages metadata of a multiplicity of files which have been generated by users who have registered themselves with the file management application. The module 338, on the basis of the metadata, can generate a view of the files stored in a distributed manner and can make this available to the user computer systems 104, 162, 168 via the network 178 without, however, possessing access to the content of the files.

Furthermore, the server 130 can comprise a module 340. This enables a dynamic creation and forwarding of distribution schedules for the distributed storage of a file 101, wherein an error correction method FKV is specified in the distribution schedule as well as a plurality of memory services SD1-SD6, wherein both said error correction methods and said memory services can be dynamically selected such that the requirements 308, 320 of the user wishing to store the file in a distributed manner are met.

On the whole, in accordance with embodiments, a flexible solution for secure and highly available data storage with use of a plurality of external memory services can thus be provided. Any users, even those who have not registered with the file management application, can access files stored in a distributed manner, provided they have the corresponding authorisations and provided they have installed only the client application 108, which can communicate with the file management application and the memory services via the interface 132 in order to reconstruct the original files from the metadata in the file fragments.

Figure 4:
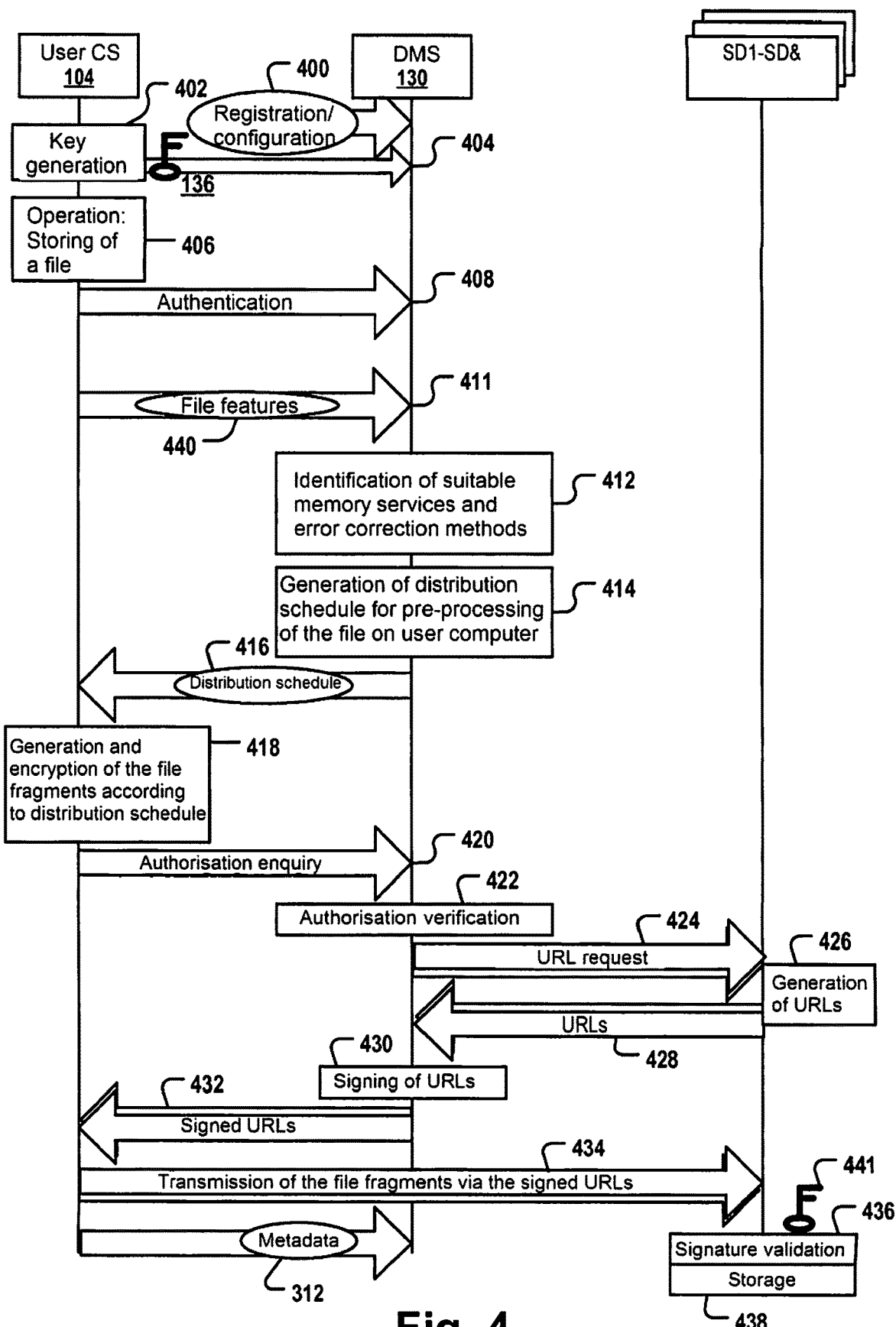
FIG. 4 shows a flow diagram of the distributed storage of a file.

FIG. 4 shows the course of the distributed storing of a file in accordance with an embodiment. Firstly, for example during the course of the installation of the client application 108 on the user computer system 104, an asymmetric cryptographic key pair including a private decryption key 138 and a public encryption key 136 is formed automatically by the client application. The private decryption key is stored in a protected manner in the storage medium 106 of the user computer system. The public encryption key 136 is transferred via the interface 132 to the file management application 304 and is stored there centrally as part of a user profile 174 of the user 102.

The public key 136 by way of example can be transferred during the course of a registration 400 of the user with the file management application. During the registration or also thereafter, the user has the possibility to configure his user profile and in particular his requirements 308 contained therein to the technical and financial properties of the memory services and his requirements to the preconditions 310, 316 for granting authorisation to other users or user groups to access his data. In order to store a specific file, a storage operation 406 for access to a number of memory services is necessary. In order to enable this, however, there is no direct authentication at the individual memory services. Rather, the user computer system 104 in step 408 firstly authenticates itself to the file management server 130. In addition, the user computer system sends features 440 of the file to be stored to the file management server in step 411.

The file management server analyses the requirements 308 of the user stored in the user profile 174, analyses a catalogue containing specifications of all currently available memory services, and additionally analyses features of the file (for example the file size, the type of file, etc.). On the basis of the analysed data, the file management server in step 412 automatically identifies the identity and number of those memory services which should be used to store file fragments of the file 101 to be stored. In addition, the file management server identifies an error correction method and configuration thereof, which is capable of dividing the file to be stored into file fragments, such that the requirements 308 of the user with regard to the costs, the security, the geographical location of the individual memory services used for storage and/or the data transfer speed via the network are met.

In addition, the error correction method must also distribute the file among file fragments so that the requirements of the user with regard to the availability of the file are met. Generally, it is true that the higher the proportion of error correction bits per file fragment, the greater is the data volume to be transferred via the network; and the greater is the redundancy of the transferred data, the higher is also the availability of the file in spite of a potential failure of one or more of the memory services.

The file management server in step 414 generates a distribution schedule 416, which includes identifiers of the determined memory services and also instructions for carrying out the determined error correction methods (for example configuration data of the error correction method). The distribution schedule is transferred to the user computer system 104 via the network. Alternatively, in some embodiments, the distribution schedule can also be created by the user computer system. The user computer system in step 418 generates a plurality of file fragments F1-F4 by means of the error correction method specified in the distribution schedule and encrypts these. The file fragments for example can each be encrypted with a hash value of the original file 101, which serves as a symmetric cryptographic key.

In order to be able to store the generated file fragments, the user computer system sends an authorisation enquiry in step 420 to the file management server, wherein this authorisation enquiry includes an enquiry as to whether the user computer system 104 is authorised to have write access to the memory services or storage media thereof specified in the distribution schedule in order to store there the file fragments. In response to the receipt of the authorisation enquiry, the file management server 130 in step 422 checks whether the user computer system is authorised for the queried write operation. If this is the case and the user additionally has successfully authenticated himself 408 to the file management server 130, the file management system 130 requests authorisation tokens via the network from the memory services specified in the distribution schedule and in the authorisation enquiry. The authorisation tokens can be formed for example as URLs 424. In response to the receipt of the request, the individual memory services in step 426 generate URLs for access to a storage region of storage media of the respective memory services and send the URLs to the file management server. In step 430 the file management server assigns the received URLs and forwards them in signed form 432 to the user computer system.

The user computer system uses the signed URLs in order to have direct write access by means of these to the storage regions of the stores of the individual memory services specified in the URLs and in order to store the file fragments F1-4 directly in the storage media of said memory services SD2, SD4-SD6 via the network, with bypassing of the file management server 130. However, the individual memory services in step 436 perform a signature validation of the signed URLs by means of a signature validation key, which together with the signing key 334 of the file management server forms an asymmetric cryptographic key pair. File fragments are stored in step 438 only if the validation revealed that the signature of the URL was valid.

In accordance with some embodiments, path specifications which refer to the file fragments stored in the storage media of the memory services and which relate to the symmetric cryptographic key used to encrypt the file fragments and also optionally further data are stored by the user computer system as metadata 312 for the file 101 stored in a distributed manner and are transferred to the file management server 130. In accordance with some embodiments, the metadata contain the symmetric cryptographic key in encrypted form, wherein the public key 136 of the user computer system 104, by means of which the file was stored, serves for encryption of the symmetric key. It is also possible that, in response to an access enquiry of another user computer system by way of the file management server, further versions of the metadata are generated and are transferred by way of the file management server to the querying user computer system. This is explained in greater detail in FIG. 5.

Figure 5:
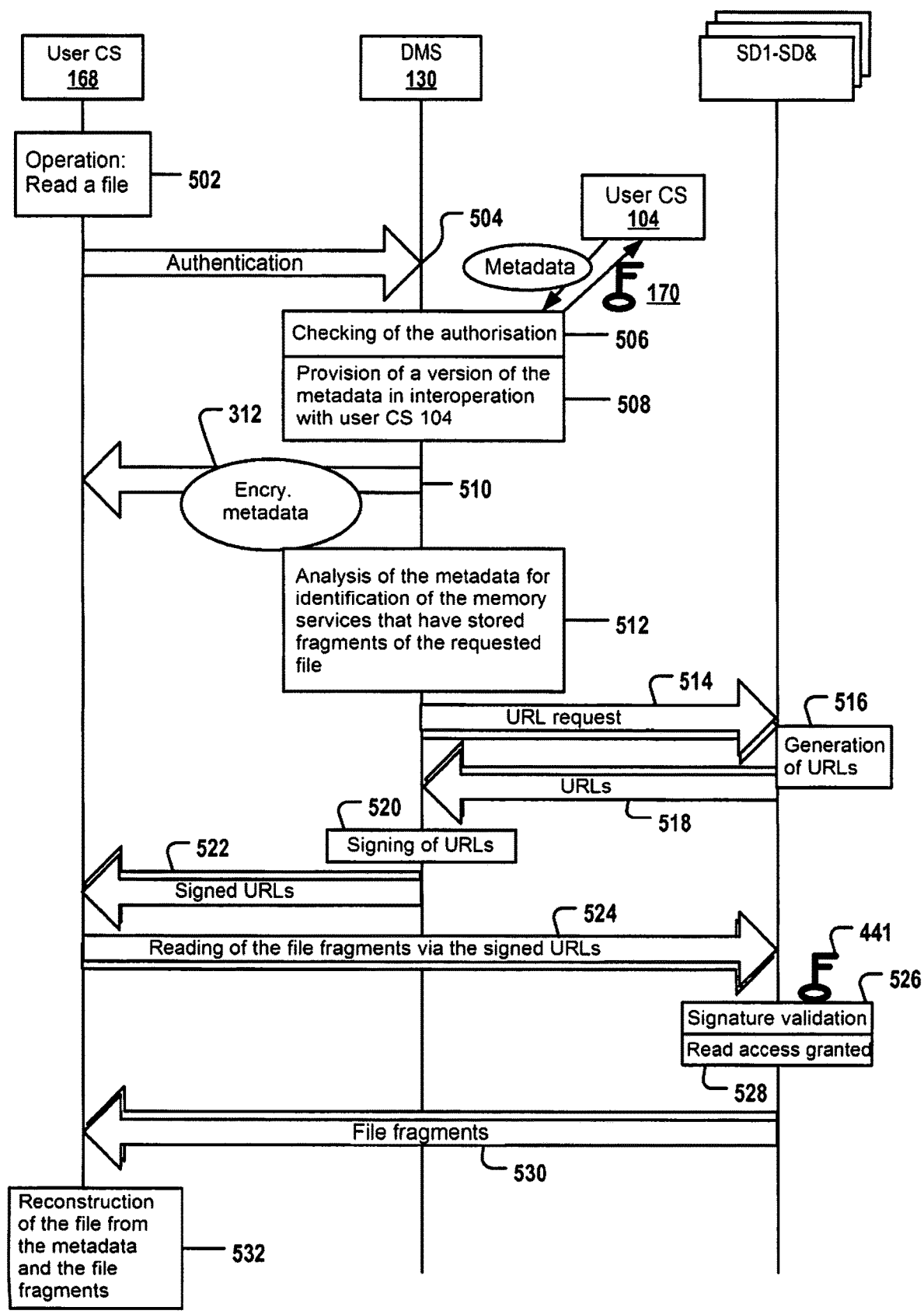
FIG. 5 shows a flow diagram of the reading of a file stored in a distributed manner.

FIG. 5 shows a flow diagram of read access of a user computer system 168 of another user 160 to the file 101 stored in a distributed manner. A client application 108 or alternatively also the file management application 304 on the file management server can generate and display to the user 160, by means of metadata 312, 324 already provided, a view of a number of files stored in a distributed manner in accordance with various distribution schedules. The user, for example by means of the user computer system 168, can select a visual representation, for example a file symbol of the file 101 stored in a distributed manner, so as to have read access thereto. This process is illustrated as a read operation 502. In order to be able to have read access to the file 101, the user 160 in step 504 authenticates himself firstly to the file management server 130, for example by means of his identity document, his biometric data, or a password-based authentication method. Following successful authentication, the file management server checks whether the further user 160 has is authorised for read access to the file 101. For this purpose, the file management server analyses the configuration 175 of the owner 102 of the file 101, in particular the specifications thereof with regard to a required minimum trust level 310, a required computer type 316 and/or with regard to rules relating to the access authorisations of individual users and user groups ("Access Control List"), which can also be part of the configuration 175 of the user 102.

If the analysis reveals that the user 160 is authorised for read access to the file 101 and has successfully authenticated himself, and where applicable the computer type and the minimum trust level of the used authentication method 504 also correspond to the requirements specified by the user 102, the file management server in step 508 identifies or generates the metadata 312, which allow a reconstruction of the file 101 from the file fragments F1-F4, and sends these in step 510 to the user computer system 168 of the user 160. The metadata identified in step 508 can be a version of the metadata generated specifically for the file 101 and specifically for the further user computer system 168. The generation of the metadata specified for the user computer system 168 querying read access can include the fact that the file management server, which inter alia also manages the public key 170 of the computer system 168, after determining that the user computer system 168 is authorised for access to the file 101, sends the public key 170 of this user computer system 168 to the user computer system 104. The user computer system 104 uses the public key 170 in order to encrypt the symmetric key used to encrypt the file fragments. The encrypted symmetric key is combined with further data, for example the path specifications to the file fragments, in order to provide the further version of the metadata of the file 101 and to send this to the file manager. The file management server forwards the further version of the metadata to the querying further user computer system 168. This decrypts the symmetric cryptographic key of said version of the metadata using its private key 172. In addition, the file management server in step 512 analyses the forwarded metadata in order to identify the memory services in which the file fragments F1-F4 of the file 101 are stored.

In the next step, the file management server sends a request 514 to receive authorisation tokens for reading the file fragments to the memory services identified in step 512. In response to the receipt of the request, the identified memory services in step 516 generate authorisation tokens, for example in the form of URLs, which point to the file fragments stored by the corresponding service. The generated authorisation tokens 512 are transmitted to the file management server via the network and are signed thereby in step 520 using the signing key thereof. The signed authorisation tokens 522 are transferred to the further user computer system 168 and enable this to perform a direct read access 524 to the storage media of the corresponding memory services by means of the signed URLs. However, the read access is only permitted by the corresponding memory services if a signature validation by means of the signature validation key 441 in step 526 by the corresponding memory services reveals that the signature of the authorisation tokens is valid. In this case, the memory services in step 528 give permission to read the corresponding file fragments stored by the client in encrypted form. The encrypted file fragments 530 are transferred directly via the network to the user computer system 168 and are decrypted there in step 532 by a client application 108 stored on the user computer system 168 with the aid of the generated further version of the metadata and are assembled to form the original file 101. The symmetric key decrypted by means of the private key 172 of the further computer system 168 here allows the user computer system 168 to decrypt the received metadata.

Figure 6:
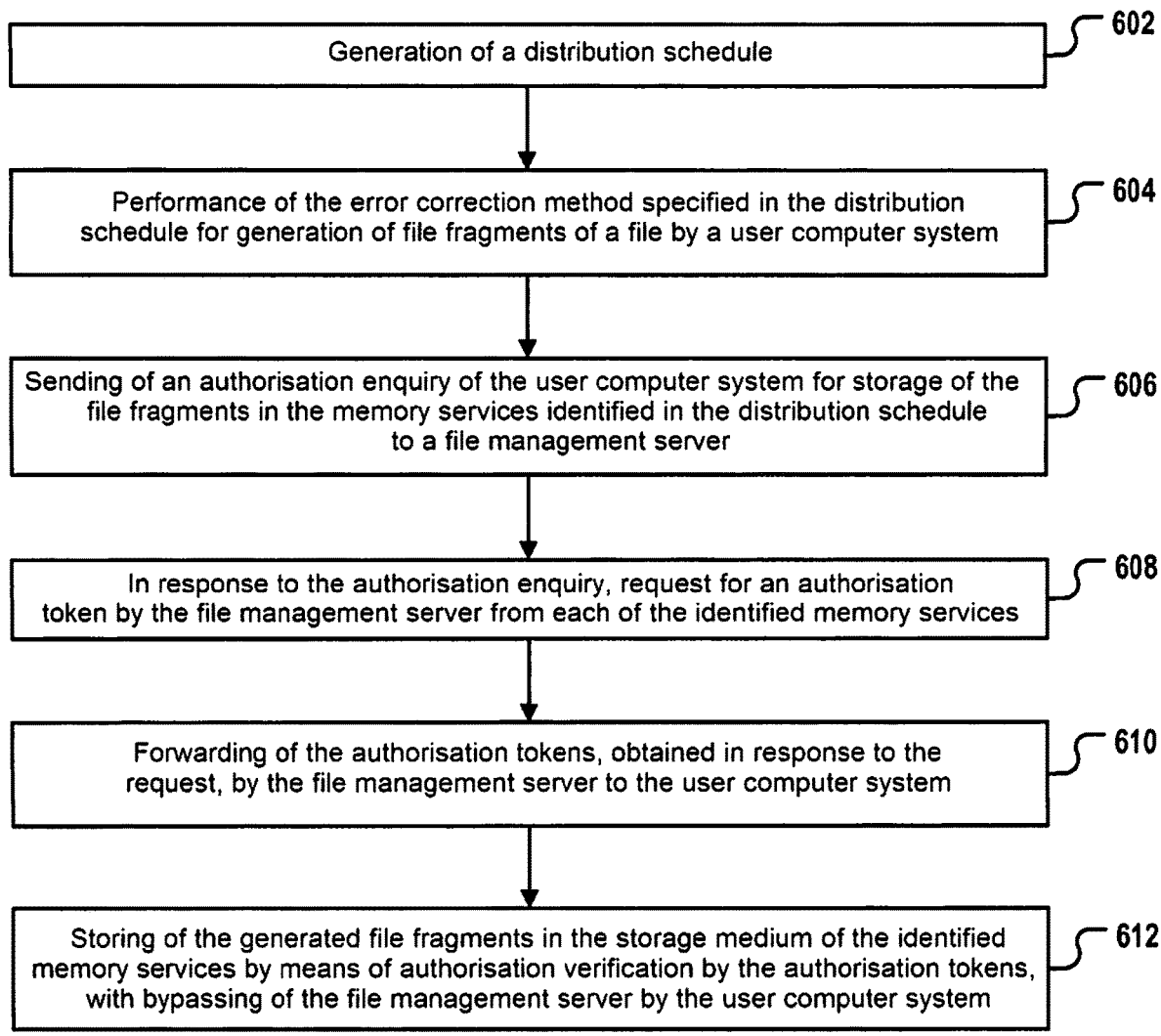
FIG. 6 shows a flow diagram of an embodiment of a method according to the invention.

FIG. 6 shows a method for storing a file by means of a plurality of memory services via a network with use of a file management server. In a first step 602 a client application 108 on a user computer system or a file management application 304 on a file management server 130 generates a distribution schedule 416. In step 604, the client application 108 on the user computer system 104 performs an error correction method which is specified in the distribution schedule and generates file fragments which are to be stored in accordance with the distribution schedule in a plurality of the memory services SD2, SD4-SD6. For this purpose, the client application 108 in step 606 sends an authorisation query relating to the storage of the file by means of the memory services specified in the distribution schedule 416 to the file management application 304 of the file management server 130. In response to the receipt of the authorisation enquiry, the file management application requests an authorisation token from each of the memory services in which a file fragment is to be stored. In step 610 the file management application forwards the authorisation tokens, requested by the file management application from said memory services and received by the file management application in response, to the client application 108. In accordance with some embodiments, the authorisation tokens are signed by the file management application prior to being forwarded. The client application in step 612 proves its authorisation to write the file fragments to the individual memory services with the aid of the authorisation tokens, and, following successful confirmation of the authorisation, stores the generated file fragments in the storage media of the individual memory services, with bypassing of the file management server.

| List of reference signs | |
|---|---|
| F1-11 4 | file fragments |
| FKV | error correction method |
| SD1-SD6 | memory services |
| SM1-SM6 | storage media |
| 180-192 | IT infrastructure of the memory services |
| 101 | file |

| List of reference signs | |
|---|---|
| 102 | user |
| 104 | user computer system |
| 106 | storage medium |
| 108 | client application |
| 110 | initialisation module |
| 112 | (de)fragmentation module |
| 114 | distribution/aggregation module |
| 116-128 | standardised interfaces |
| 130 | file management server |
| 132 | interface |
| 134 | user interface |
| 135 | processor |
| 136 | public key |
| 138 | private key |
| 160 | user |
| 162 | user computer system |
| 164 | public key |
| 166 | private key |
| 168 | user computer system |
| 170 | public key |
| 172 | private key |
| 174 | user profiles |
| 175 | configuration |
| 176 | user profile |
| 177 | configuration |
| 178 | network |
| 302 | storage medium |
| 304 | file management application |
| 306 | directory of a number of user profiles |
| 308 | requirements |
| 310 | minimum trust level |
| 312 | metadata |
| 314 | required geographical location |
| 316 | required computer type |
| 320 | requirements |
| 322 | minimum trust level |
| 324 | metadata |
| 326 | required geographical location |
| 328 | required computer type |
| 329 | memory service catalogue |
| 330 | module for authorisation management |
| 332 | module for managing authorisation tokens |
| 334 | signing key |
| 336 | module for authenticating users |
| 338 | module for processing metadata |
| 340 | module for generating distribution schedules |
| 400-414 | steps |
| 416 | distribution schedule |
| 418-422 | steps |
| 424 | URL request |
| 426 | step |
| 128 | authorisation token |
| 430 | step |
| 432 | signed authorisation token |
| 434 | transmitted file fragments |
| 436-138 | steps |
| 440 | file features |
| 441 | signature validation key |
| 502-512 | steps |
| 514 | request for authorisation token |
| 516 | steps |
| 518 | authorisation token |
| 520 | steps |
| 522 | signed authorisation token |
| 524 | read access |
| 526-528 | steps |
| 530 | transferred file fragments |
| 532 | step |
| 602-612 | steps |

The invention claimed is:

1. A method for storing data, wherein the method comprises the following steps in order to store a file and to manage a public key of a further user computer system of a further user:

automatically generating a distribution schedule, which contains instructions for generating file fragments of the file by means of an error correction method and identifiers of a number of memory services, in a non-volatile storage medium of which the generated file fragments are to be stored, by a file management server or by a user computer system;

performing the error correction method specified in the distribution schedule for generation of the file fragments from the file by the user computer system, wherein at least one of the file fragments contains error correction bits;

sending an authorisation enquiry of the user computer system for storing the file fragments in the memory services identified in the distribution schedule to the file management server via a network;

in response to receipt of the authorisation enquiry, requesting an authorisation token by the file management server from each of the memory services identified in the distribution schedule and forwarding the authorisation tokens obtained in response to the request to the user computer system by the file management server, wherein the authorisation tokens are formed as URLs, which each enable direct write or direct read access to a storage space on a storage medium of one of the memory services identified by the URL; and storing the generated file fragments via the network in the storage medium of the identified memory devices by means of authorisation verification by the authorisation tokens, with the user computer system bypassing the file management server;

authenticating the further user to the file management server;

after successful authentication, checking, by the file management server, whether the further user is authorised for read access to the file; and if the analysis reveals that the further user is authorised for read access to the file and has successfully authenticated himself, generating a further version of the metadata, wherein the further version of the metadata allows a reconstruction of the file from the file fragments, wherein the further version of the metadata is generated specifically for the file and specifically for the further user computer system, wherein the generation of the further version of the metadata of the file includes, sending, by the file management server, the public key of the further user computer system to the user computer system which generated the file and encrypted fragments thereof using its symmetric key, encrypting the symmetric key using the public key of the further user computer system by the user computer system which generated the file, combining the encrypted symmetric key with further data by the user computer system which generated the file, in order to create the further version of the metadata, sending the further version of the metadata to the file management server, and forwarding the further version of the metadata by the file management server to the further user computer system in order to enable the further user computer system to decrypt the symmetric key using its private key, which together with the public key forms an asymmetric cryptographic key pair, wherein metadata, which allow the reconstruction of the file from the stored file fragments, are stored in the user computer system and/or the file management server and are protected against access by the memory services.

2. The method according to claim 1, comprising the following steps:

providing a configuration, which contains requirements of a user with regard to the speed, the geographical location, the security and/or the costs of an IT infrastructure to be used for the storing of data and also requirements with regard to the availability of the data to be stored;

providing a memory service catalogue, which comprises specifications of a multiplicity of available memory services, wherein the specification of each of the memory services contains details with regard to the speed, the geographical location, the security and/or the costs of an IT infrastructure of the memory service used for the storing of the data;

in order to generate the distribution schedule, automatically evaluating the configuration and the memory service catalogue so as to identify, depending on the specifications of the available memory services and depending on the user requirements, an error correction method from a multiplicity of error correction methods that meets the requirements with regard to the availability of the data to be stored and so as to identify the plurality of memory services identified in the distribution schedule from the multiplicity of available memory services that are suitable for storing the file in accordance with the user-specific requirements with regard to the speed, geographical location, security and/or costs of the IT infrastructure to be used for the storing of data; and;

using the identified error correction method as the error correction method for generating the file fragments of the file according to the distribution schedule.

3. The method according to claim 1, further comprising the following steps:

generating the metadata by the user computer system, wherein the user computer system is assigned to a user, wherein the metadata include:

paths to all memory locations in the storage media of the memory services in which the file fragments of the file are to be stored or have already been stored; and/or a symmetric key, which allows a decryption of the file fragment encrypted with this symmetric key; and/or for each of the file fragments, a hash value of the file fragment calculated by the user computer system; and/or the original file name of the file stored in a distributed manner, and/or configuration data of the error correction method;

a mapping of the original file name to the hash values and paths of the generated file fragments;

storing the metadata in the user computer system;

transferring the metadata to the file management server; and using the metadata by the file management server to control the access of a further user to the file.

4. The method according to claim 3, wherein metadata of a multiplicity of files stored in a distributed manner in the memory services are stored in the user computer system and the method comprises a use of said metadata by a client application of the user computer for generation of a client-based view of the files stored in a distributed manner; and/or wherein metadata of a multiplicity of files stored in the memory services in a distributed manner are stored in the file management server and the method comprises a use of said metadata by a web portal hosted on the file management server for generation of a network-based view of the files stored in a distributed manner, wherein the client-based and/or the network-based view is configured to dynamically reconstruct the original file names from the metadata and, by selection of one of the files stored in a distributed manner, to initiate a dynamic and automatic reconstruction of the file content of the selected file by the user computer system or by a further authorised user computer system, wherein the memory services in which fragments of the selected file are stored are hidden by the view.

5. The method according to claim 2, wherein the determination of the error correction method which meets the user requirements with regard to the availability of the file includes a determination of the anticipated total size of all file fragments to be generated by the error correction method, wherein for each of the file fragments to be generated, a memory service is identified which, in accordance with its specifications, meets the requirements with regard to the speed, geographical location, security and/or costs under consideration of the anticipated total size; and/or wherein, if the determined error correction method would prompt the generation of file fragments of which the total size does not make it possible to identify a sufficient number of memory services which, in accordance with their specifications, meet the requirements with regard to the speed, security and/or costs under consideration of the total size, automatically determining another error correction method, which is configured to generate file fragments of which the anticipated total size is sufficiently small so that, for each file fragment to be generated, a memory service can be identified which, in accordance with its specifications, meets the requirements with regard to the speed, geographical location, security and/or costs under consideration of the anticipated total size; and/or wherein, in order to meet the user requirements with regard to a maximum duration of the data transfer for the transfer of the file via the network, the determined error correction method is automatically configured so that, as a result of this method, a sufficiently large number of the generated file fragments is generated, such that with parallel transfer of these file fragments to the plurality of memory services or from the plurality of memory services identified in the distribution schedule the transfer time for all file fragments lies below the maximum duration.

6. The method according to claim 2, wherein the user computer system is assigned to a user, wherein the configuration also contains one or more of the following data items in user-configurable form:

a minimum trust level, which specifies a minimum level of reliability of an authentication method by means of which a further user must authenticate himself to the file management server so as to be allowed to access the file stored in the memory media of the identified memory services.

7. The method according to claim 1, also comprising the steps of:

calculating a hash value of the entire file by the user computer system;

encrypting each of the file fragments of the file by the user computer system, wherein the hash value is used as a symmetric key for encryption of the file fragments by the user computer system;

generating the metadata, wherein the metadata include the calculated hash value of the total file and hash values of the file fragments, by the user computer system;

encrypting the generated metadata, which include the symmetric key, or at least the symmetric key, by a public key, which is assigned to the user computer system of a user or a further user computer system of a further user authorised to access the file, wherein a private key together with the public key forms an asymmetric cryptographic key pair, wherein the public key in the file management server is linked to a user profile of the user assigned to the public key; and wherein the file fragments are stored in encrypted form in the storage media of the identified memory services.

8. The method according to claim 1, also comprising the steps of:

authenticating the user computer system to the file management server, upon receipt of the authorisation enquiry of the user computer system for storage of the file fragments, checking, by the file management server, whether the user to whom the user computer system is assigned has access rights in order to store the file by means of the identified memory services;

wherein the file management server requests the authorisation token only following successful authentication and only if the user has the access rights.

9. The method according to claim 1, wherein the authorisation tokens which are transmitted in response to the request of the file management server from each of memory services identified in the distribution schedule to the file management server are selectively generated only for the authorisation enquiry to store the file and have only temporary validity.

10. The method according to claim 1, wherein a signing key is managed by the file management server in a form stored in a protected manner, said method also comprising the steps of:

providing a signature validation key to each of the memory services, wherein the signature validation key is designed to validate the signatures generated by the signing key;

signing of the authorisation tokens received from each of the identified memory services with the signing key by the file management server, wherein the authorisation tokens are forwarded in signed form to the user computer system, wherein each of the signed authorisation tokens enables a receiver of this signed authorisation token to access a storage space on the storage medium of the corresponding memory service identified by the authorisation token only when the memory service in question identifies the signature as being valid.

11. The method according to claim 1, also comprising the steps of:

receiving an access enquiry of a further user computer system for access to the file stored in a distributed manner, wherein the access enquiry is received by the file management server;

identifying the memory services that have stored file fragments of the file on the basis of the metadata of the file by the file management server, checking, by the file management server, whether a further user, to whom the further user computer system is assigned, has access rights for the type of requested access to the file;

authenticating the further user computer system to the file management server, following successful authentication and if the further user has access rights for the file, requesting a further authorisation token by the file management server form each of the identified memory services and forwarding the further authorisation tokens obtained in response to this request to the further user computer system by the file management server, wherein the further authorisation tokens allow the further user computer system to have the requested access to the file fragments stored by the memory services in direct form.

12. The method according to claim 1, also comprising the steps of:

checking by the file management server whether the authentication method used to authenticate the further user to the file management server is sufficiently reliable to meet the minimum trust level for the requested access configured by the user;

wherein the request for the further authorisation token is only sent from the file management server to the identified memory services when the further user has successfully authenticated himself to the file management server, has access rights for the requested file, and the used authentication method has a trust level that is at least as high as the minimum trust level specified in the configuration of the user.

13. The method according to claim 11, wherein the configuration of the user contains a specification of a type of computer which is alone authorised to access data that the user has stored in the storage media of the identified services; and wherein the request of the further authorisation token is only sent from the file management server to the identified memory services if the further user computer system, from which the further user has sent the access enquiry to the file management server, meets said specification of the sole authorised computer type.

14. The method according to claim 11, further comprising the steps of:

managing a user profile of the further user by the file management server, wherein the user profile contains a public key, which together with a private decryption key forms an asymmetric cryptographic key pair, wherein the private decryption key is stored in a protected manner in the further user computer system and serves to decrypt the metadata of the file or to decrypt parts of the metadata; and if the user has authenticated himself successfully to the file management server and if the further user has the access rights for the file, sending the public key by the file management server to the user computer system for encryption of the metadata or of parts of the metadata by the user computer system and receiving and forwarding the metadata of the file wholly or partially encrypted using the sent public key by the file management server to the further user computer system so as to enable the further user computer system to decrypt the forwarded metadata using the private decryption key and to reconstruct the file from the file fragments.

15. A non-transitory computer-readable storage medium with computer-readable instructions which, with execution by a processor, configure the processor to:

automatically generate a distribution schedule, which contains instructions for generating file fragments of the file by means of an error correction method and identifiers of a number of memory services, in the non-volatile storage media of which the generated file fragments are to be stored, by a file management server or by a user computer system;

perform the error correction method specified in the distribution schedule for generation of the file fragments from the file by the user computer system, wherein at least one of the file fragments contains error correction bits;

send an authorisation enquiry of the user computer system for storing the file fragments in the memory services identified in the distribution schedule to the file management server via a network;

in response to receipt of the authorisation enquiry, request an authorisation token by the file management server from each of the memory services identified in the distribution schedule and forwarding the authorisation tokens obtained in response to the request to the user computer system by the file management server, wherein the authorisation tokens are formed as URLs, which each enable direct write or direct read access to a storage space on the non-transitory computer-readable storage medium of one of the memory services identified by the URL;

store the generated file fragments via the network in the storage media of the identified memory devices by means of authorisation verification by the authorisation tokens, with the user computer system bypassing the file management server;

authenticate the further user to the file management server;

after successful authentication, check, by the file management server, whether a further user of a further user computer system is authorised for read access to the file; and if the analysis reveals that the further user is authorised for read access to the file and has successfully authenticated himself, generate a further version of the metadata, wherein the further version of the metadata allows a reconstruction of the file from the file fragments, wherein the further version of the metadata is generated specifically for the file and specifically for the further user computer system, wherein the generation of the further version of the metadata of the file includes, sending, by the file management server, a public key of the further user computer system to the user computer system which generated the file and encrypted fragments thereof using its symmetric key, encrypting the symmetric key using the public key of the further user computer system by the user computer system which generated the file, combining the encrypted symmetric key with further data by the user computer system which generated the file, in order to create the further version of the metadata, sending the further version of the metadata to the file management server, and forwarding the further version of the metadata by the file management server to the further user computer system in order to enable the further user computer system to decrypt the symmetric key using its private key, which together with the public key forms an asymmetric cryptographic key pair, wherein metadata, which allow the reconstruction of the file from the stored file fragments, are stored in the user computer system and/or the file management server and are protected against access by the memory services.

16. A user computer system comprising a processor, a network interface for operatively coupling the user computer system to a multiplicity of memory services and to a file management server via a network, wherein the user computer system comprises a memory medium with a client application that can be executed by the processor, wherein the client application is configured to execute the following method for storing a file and managing a public key of a further user computer system of a further user:

- using a distribution schedule, which contains instructions for generating file fragments of the file by means of an error correction method and identifiers of a number of memory services in the non-volatile storage media of which the generated file fragments are to be stored, wherein the file management server does not provide a memory service;
- performing the error correction method specified in the distribution schedule for generating the file fragments of the file, wherein at least one of the file fragments includes error correction bits;
- sending an authorisation enquiry of the user computer system for storing the file fragments in the memory services identified in the distribution schedule to the file management server via the network;
- in response to the sending of the authorisation enquiry, receiving authorisation tokens from the file management server for each of the memory services identified in the distribution schedule, wherein the authorisation tokens are formed as URLs, which each enable direct write or direct read access to a storage space on a storage medium of one of the memory services identified by the URL; and
- storing the generated file fragments via the network in the storage media of the identified memory services by means of authorisation verification by the authorisation tokens, with the user computer system bypassing the file management server, wherein metadata, which allow the reconstruction of the file from the stored file fragments, are protected against access by the memory services;
- authenticating the further user to the file management server;
- after successful authentication, checking, by the file management server, whether the further user is authorised for read access to the file; and
- if the analysis reveals that the further user is authorised for read access to the file and has successfully authenticated himself, generating a further version of the metadata, wherein the further version of the metadata allows a reconstruction of the file from the file fragments, wherein the further version of the metadata is generated specifically for the file and specifically for the further user computer system, wherein the generation of the further version of the metadata of the file includes,
  - sending, by the file management server, the public key of the further user computer system to the user computer system which generated the file and encrypted fragments thereof using its symmetric key,
  - encrypting the symmetric key using the public key of the further user computer system by the user computer system which generated the file,
  - combining the encrypted symmetric key with further data by the user computer system which generated the file, in order to create the further version of the metadata,
  - sending the further version of the metadata to the file management server, and
  - forwarding the further version of the metadata by the file management server to the further user computer system in order to enable the further user computer system to decrypt the symmetric key using its private key, which together with the public key forms an asymmetric cryptographic key pair.

17. A file management server comprising a processor, a network interface for operatively coupling the file management server to at least one user computer system and to a multiplicity of memory services via a network, wherein the file management server comprises a storage medium with a file management application which can be executed by the processor, wherein the file management application is configured to execute the following method for storing a file and managing a public key of a further user computer system of a further user:

- receiving an authorisation enquiry of the user computer system to store file fragments of a file via the network in a plurality of the memory services, wherein the file management server does not provide a memory service;
- in response to the receipt of the authorisation enquiry, requesting an authorisation token from each of the plurality of memory services and forwarding the authorisation tokens obtained in response to the request to the user computer system, wherein the authorisation tokens are formed as URLs, which each enable direct write or direct read access to a storage space on the storage medium of one of the memory services identified by the URL, and wherein metadata, which allow the reconstruction of the file from the stored file fragments, are protected against access by the memory services;
- authenticating the further user to the file management server;
- after successful authentication, checking, by the file management server, whether the further user is authorised for read access to the file; and
- if the analysis reveals that the further user is authorised for read access to the file and has successfully authenticated himself, generating a further version of the metadata, wherein the further version of the metadata allows a reconstruction of the file from the file fragments, wherein the further version of the metadata is generated specifically for the file and specifically for the further user computer system, wherein the generation of the further version of the metadata of the file includes,
  - sending, by the file management server, the public key of the further user computer system to the user computer system which generated the file and encrypted fragments thereof using its symmetric key,
  - encrypting the symmetric key using the public key of the further user computer system by the user computer system which generated the file,
  - combining the encrypted symmetric key with further data by the user computer system which generated the file, in order to create the further version of the metadata,
  - sending the further version of the metadata to the file management server, and
  - forwarding the further version of the metadata by the file management server to the further user computer system in order to enable the further user computer system to decrypt the symmetric key using its private key, which together with the public key forms an asymmetric cryptographic key pair.

* * * * *